(12) United States Patent
Hu et al.

(10) Patent No.: US 10,774,677 B2
(45) Date of Patent: Sep. 15, 2020

(54) SYSTEMS AND METHODS FOR A VARIABLE INLET COMPRESSOR

(71) Applicant: Ford Global Technologies, LLC, Dearborn, MI (US)

(72) Inventors: Liangjun Hu, Bloomfield Hills, MI (US); Jianwen James Yi, West Bloomfield, MI (US); David Hanna, Troy, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 113 days.

(21) Appl. No.: 15/991,843

(22) Filed: May 29, 2018

(65) Prior Publication Data

US 2019/0368374 A1 Dec. 5, 2019

(51) Int. Cl.
*F01D 17/16* (2006.01)
*F01D 9/04* (2006.01)
(Continued)

(52) U.S. Cl.
CPC .......... *F01D 17/165* (2013.01); *F01D 9/041* (2013.01); *F02B 37/24* (2013.01); *F02C 6/12* (2013.01);
(Continued)

(58) Field of Classification Search
CPC ........ F01D 17/165; F01D 9/041; F02B 37/24; F02C 6/12; F04D 27/0215; F05D 2240/12
(Continued)

(56) References Cited

U.S. PATENT DOCUMENTS 2,660,366 A * 11/1953 Klein .................. F04D 27/0215
415/58.4
3,289,919 A * 12/1966 Wood .................. F04D 29/4213
415/160
(Continued)

FOREIGN PATENT DOCUMENTS

DE        19823274 C1 * 10/1999  ......... F04D 29/4213
DE    102012011423 B3 * 11/2013  ................ F02C 6/12
(Continued)

OTHER PUBLICATIONS

Uchida, H. et al., "Development of a Wide Flow Range Compressor with Variable Inlet Guide Vane," R&D Review of Toyota CRDL, vol. 41, No. 3, Nov. 2006, 6 pages.
(Continued)

*Primary Examiner* — Thai Ba Trieu
(74) *Attorney, Agent, or Firm* — Geoffrey Brumbaugh; McCoy Russell LLP

(57) ABSTRACT

Methods and systems are provided for a compressor having a variable inlet device and an active casing treatment. In one arrangement, a system for a compressor may include a casing forming a recirculation passage surrounding an inlet passage, an active casing treatment surrounding the inlet passage and configured to selectively control gas flow through the recirculation passage, an impeller, and a variable inlet device positioned in the inlet passage upstream of the impeller and configured to selectively reduce an effective size of the impeller. The variable inlet device and the active casing treatment may be adjusted based on operating conditions in order to increase a flow range of the compressor while providing high compressor efficiency.

19 Claims, 13 Drawing Sheets

(51) Int. Cl.
*F02B 37/24* (2006.01)
*F02C 6/12* (2006.01)
*F04D 27/02* (2006.01)

(52) U.S. Cl.
CPC ...... *F04D 27/0215* (2013.01); *F05D 2240/12* (2013.01)

(58) Field of Classification Search
USPC ..... 60/601, 605.1, 611; 415/58.2, 58.4, 58.5
See application file for complete search history.

(56) References Cited

U.S. PATENT DOCUMENTS

| | | | | |
|---|---|---|---|---|
| 3,504,986 | A * | 4/1970 | Jackson | F04D 29/2277 |
| | | | | 415/58.5 |
| 4,231,703 | A | 11/1980 | Weiler | |
| 4,403,912 | A | 9/1983 | Pekari et al. | |
| 4,930,979 | A | 6/1990 | Fisher et al. | |
| 5,618,160 | A * | 4/1997 | Harada | F04D 27/0246 |
| | | | | 415/17 |
| 5,683,223 | A * | 11/1997 | Harada | F04D 27/02 |
| | | | | 415/17 |
| 5,807,071 | A * | 9/1998 | Brasz | F04D 27/0253 |
| | | | | 415/150 |
| 5,851,103 | A * | 12/1998 | Harada | F04D 27/0246 |
| | | | | 415/17 |
| 6,036,432 | A * | 3/2000 | Sishtla | F04D 27/0284 |
| | | | | 415/119 |
| 6,129,511 | A * | 10/2000 | Salvage | F04D 27/0284 |
| | | | | 415/150 |
| 6,648,594 | B1 * | 11/2003 | Horner | F04D 29/4213 |
| | | | | 415/58.4 |
| 7,083,379 | B2 * | 8/2006 | Nikpour | F04D 27/0246 |
| | | | | 415/144 |
| 8,210,793 | B2 * | 7/2012 | Hale | F04D 29/4213 |
| | | | | 415/58.2 |
| 8,272,832 | B2 * | 9/2012 | Yin | F04D 29/4213 |
| | | | | 415/58.4 |
| 8,517,664 | B2 * | 8/2013 | Sun | F04D 29/4213 |
| | | | | 415/58.4 |
| 8,882,444 | B2 * | 11/2014 | Williams | F04D 29/4213 |
| | | | | 415/58.4 |
| 9,091,232 | B2 * | 7/2015 | Anschel | F01D 17/165 |
| 2009/0060708 | A1 * | 3/2009 | Hale | F04D 27/0215 |
| | | | | 415/58.2 |
| 2011/0002770 | A1 * | 1/2011 | Bywater | F04D 29/4213 |
| | | | | 415/204 |
| 2015/0159664 | A1 * | 6/2015 | Olin | F04D 29/4213 |
| | | | | 415/58.2 |
| 2015/0192147 | A1 * | 7/2015 | An | F04D 29/4213 |
| | | | | 415/58.4 |
| 2016/0201693 | A1 * | 7/2016 | An | F04D 29/4213 |
| | | | | 415/58.4 |
| 2016/0230650 | A1 * | 8/2016 | Mohtar | F04D 29/4213 |
| 2017/0074291 | A1 | 3/2017 | Karim et al. | |
| 2017/0260987 | A1 * | 9/2017 | Onodera | F04D 29/4213 |
| 2018/0258842 | A1 * | 9/2018 | Villemin | F01D 17/146 |
| 2018/0258949 | A1 * | 9/2018 | Jin | F04D 29/4206 |
| 2019/0178151 | A1 * | 6/2019 | Smith | F04D 27/0253 |
| 2019/0218981 | A1 * | 7/2019 | Styles | F02D 41/005 |
| 2019/0249681 | A1 * | 8/2019 | Sishtla | F04D 27/0207 |
| 2020/0011196 | A1 * | 1/2020 | Karstadt | F02B 37/225 |

FOREIGN PATENT DOCUMENTS

| | | | | |
|---|---|---|---|---|
| EP | 3460195 A1 * | 3/2019 | | F04D 17/10 |
| JP | 2003227497 A | 8/2003 | | |
| WO | WO-2007098133 A1 * | 8/2007 | | F04D 27/0215 |

OTHER PUBLICATIONS

Zeng, T. et al., "Systems and Method for a Variable Inlet Device of a Compressor," U.S. Appl. No. 15/700,995, filed Sep. 11, 2017, 67 pages.

Zeng, T. et al., "Systems and Method for a Variable Inlet Device of a Compressor," U.S. Appl. No. 15/701,050, filed Sep. 11, 2017, 67 pages.

Zeng, T. et al., "Systems and Methods for a Bi-Valved Variable Inlet Device," U.S. Appl. No. 15/804,397, filed Nov. 6, 2017, 46 pages.

Ranga, A. et al., "Method and System for Controlling Engine Fueling," U.S. Appl. No. 15/868,674, filed Jan. 11, 2018, 58 pages.

Hu, L. et al., "Systems and Methods for a Variable Inlet Compressor," U.S. Appl. No. 15/991,797, filed May 29, 2018, 95 pages.

* cited by examiner

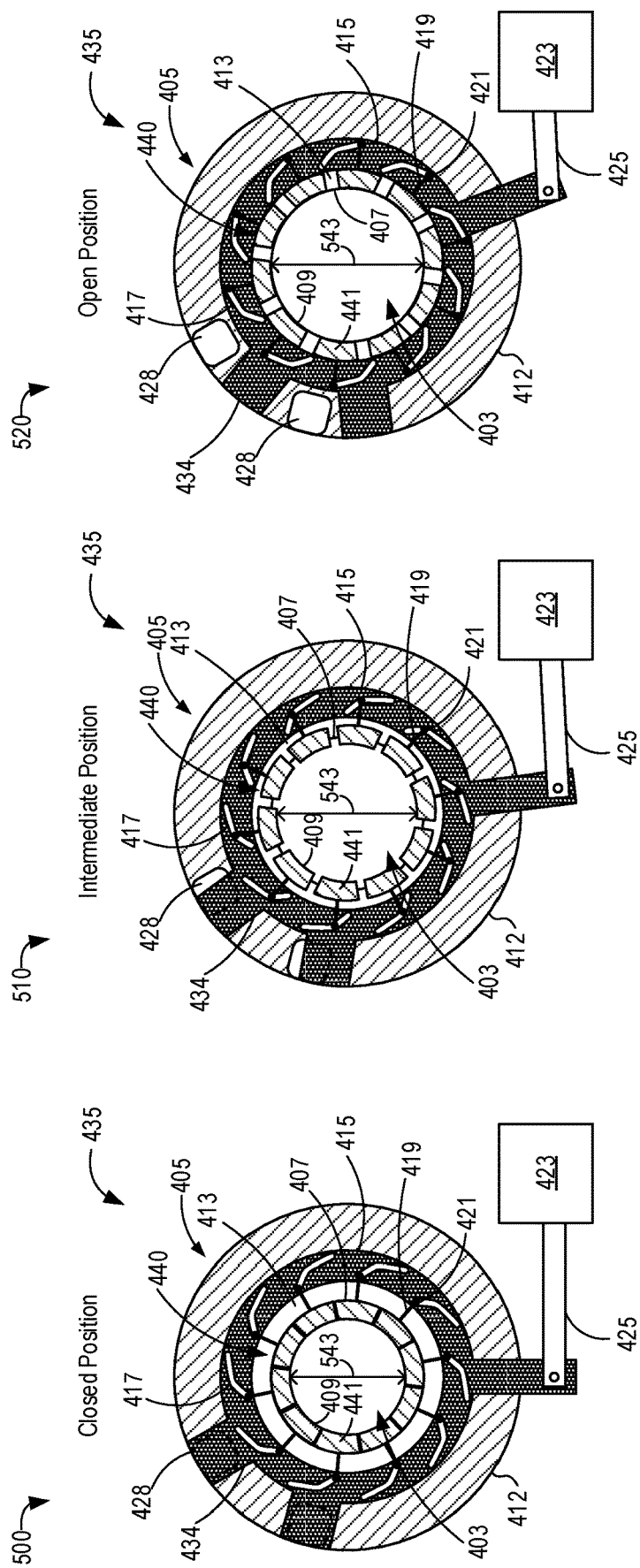

SYSTEMS AND METHODS FOR A VARIABLE INLET COMPRESSOR

FIELD

The present description relates generally to methods and systems for adjusting airflow entering a compressor.

BACKGROUND/SUMMARY

A turbocharger may be provided in an engine to increase engine torque or power output density. The turbocharger may include an exhaust-driven turbine coupled to a compressor via a drive shaft. The compressor may be fluidly coupled to an air intake manifold in the engine that delivers air to a plurality of engine cylinders. Exhaust flow from one or more engine cylinders may be directed to a turbine wheel, causing the turbine to rotate about a fixed axis. The rotational motion of the turbine drives an impeller (e.g., wheel) of the compressor, which compresses air into the air intake manifold to increase boost pressure during select engine operating conditions.

Compressor efficiency influences overall engine performance and fuel consumption. For example, lower compressor efficiency may result in slow engine transient response and higher fuel consumption for both steady-state and transient engine operation. At lighter engine loads, when compressor efficiency is reduced, there may be increased turbocharger lag during a tip-in. Additionally, compressor surge limits may restrict boost pressure rise at low engine speeds.

Compressors are prone to surge during events that lead to an increased pressure ratio across the compressor or decreased mass flow into the compressor. For example, when an operator rapidly tips-out an accelerator pedal, air flow into the compressor inlet decreases, reducing the forward flow through the compressor while the compressor is still at a high pressure ratio. This may lead to pressure accumulation at an outlet end of the compressor, driving air in a reverse direction that may degrade components of the compressor. Thus, extending a margin to surge may increase a range of conditions through which compressor operation remains stable.

Turbocharger compressors may be adapted with a mechanism to relieve pressure at the compressor outlet, in particular for turbochargers coupled to diesel engines. Larger turbochargers may be used to provide high boost pressures for diesel engine operation. However, the benefits of high boost pressure supplied by the turbocharger compressor may be offset by a higher likelihood of compressor surge. Thus, turbocharger compressors for diesel engine applications may be configured to reduce a likelihood of surge occurring by providing a path for flow recirculation. For example, the compressor may include a bleed valve that vents intake pressure to atmosphere or, alternatively, the compressor may comprise a ported shroud. The ported shroud may be a passage within an inner casing of the compressor inlet that allows air to flow in a reverse direction through the compressor, returning compressed air from the compressor outlet to the compressor inlet to lower the pressure ratio and increase mass flow into the compressor. While the ported shroud effectively reduces a likelihood of compressor surge, the presence of the ported shroud may also adversely affect compressor efficiency, especially at low compressor speeds.

Various approaches have been developed to address the issue of compressor efficiency at low mass flow rate, including combining a mechanism for reducing compressor outlet pressure with a device for controlling flow into the compressor inlet. One example approach is shown by Pekari et al. in U.S. Pat. No. 4,403,912. Therein, an engine compressor with an air bleed valve and variable guide vanes is disclosed. The bleed valve is opened to vent pressure in the compressor to maintain stable compressor operation, the opening and closing of the valve adjusted by an actuator that also controls a position of the variable guide vanes. The variable guide vanes are at a specified attitude during initial engine operation with the bleed valve fully open. The actuator adjusts the bleed valve as the engine accelerates until the bleed valve is in a fully closed position, after which continued actuation actuates the guide vanes to an attitude to enable maximum compressor operation.

However, the inventors herein have recognized potential issues with such systems. As one example, the system of U.S. Pat. No. 4,403,912 does not address adjustment of the positions of the bleed valve and variable guide vanes in response to compressor operating conditions under low speed and low mass flow during events beyond initial engine start-up, such as during accelerator pedal tip-outs. During such situations, compressor efficiency may have a significant impact on fuel consumption and engine performance. Furthermore, fully opening the bleed valve during initial engine operation may reduce compressor efficiency when combined with the variable guide vanes, resulting in reduced fuel economy.

In one example, the issues described above may be addressed by a method, comprising: adjusting an effective area of an impeller positioned in an inlet passage of a compressor while also adjusting gas flow through a casing treatment surrounding the inlet passage, the effective area and the gas flow both adjusted via a common, single actuator based on operating conditions. In this way, both of the effective area of the impeller and the gas flow through the casing treatment are adjusted responsive to operating conditions, reducing fuel consumption and increasing engine performance.

As one example, adjusting the effective area of the impeller may include adjusting an open area of a variable inlet device positioned in the inlet passage immediately upstream from a leading edge of the impeller while simultaneously adjusting a position of a valve within a recirculation passage of the casing treatment to adjust the gas flow through the casing treatment. The recirculation passage may be fluidically coupled to the inlet passage downstream of the leading edge of the impeller and upstream of the variable inlet device. For example, adjusting the open area of the variable inlet device to a smaller open area may coincide with adjusting the valve to a closed position that blocks the gas flow through the casing treatment. As another example, adjusting the open area of the variable inlet device to a larger open area may coincide with adjusting the valve to an open position that enables the gas flow through the casing treatment. In some examples, adjusting the variable inlet device the smaller open area while adjusting the valve to the closed position to block gas flow through the recirculation passage may be in response to engine load decreasing below a threshold engine load, and adjusting the variable inlet device to the larger open area while adjusting the valve to the open position may be in response to the engine load reaching or exceeding the threshold engine load. Additionally, responsive to adjusting the variable inlet device from the smaller open area to the larger open area (or vice versa) may further include adjusting one or more of a position of a throttle valve positioned downstream of the compressor and ignition timing of an engine coupled downstream from the compressor.

In this way, by simultaneously adjusting the variable inlet device to the smaller open area while adjusting the valve to the closed position with the common, single actuator, compressor surge may be mitigated at lower engine loads (and lower compressor pressure ratios and mass flows) while compressor efficiency can be increased, thereby increasing engine fuel economy. Furthermore, by simultaneously adjusting the variable inlet device to the larger open area while adjusting the valve to the open position with the common, single actuator, compressor surge may be mitigated at higher engine loads (and higher compressor pressure ratios and mass flows) while peak engine performance is enabled.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 5A-5C show a second example of a variable inlet device for a turbocharger compressor in open and closed positions.

DETAILED DESCRIPTION

Figure 1:
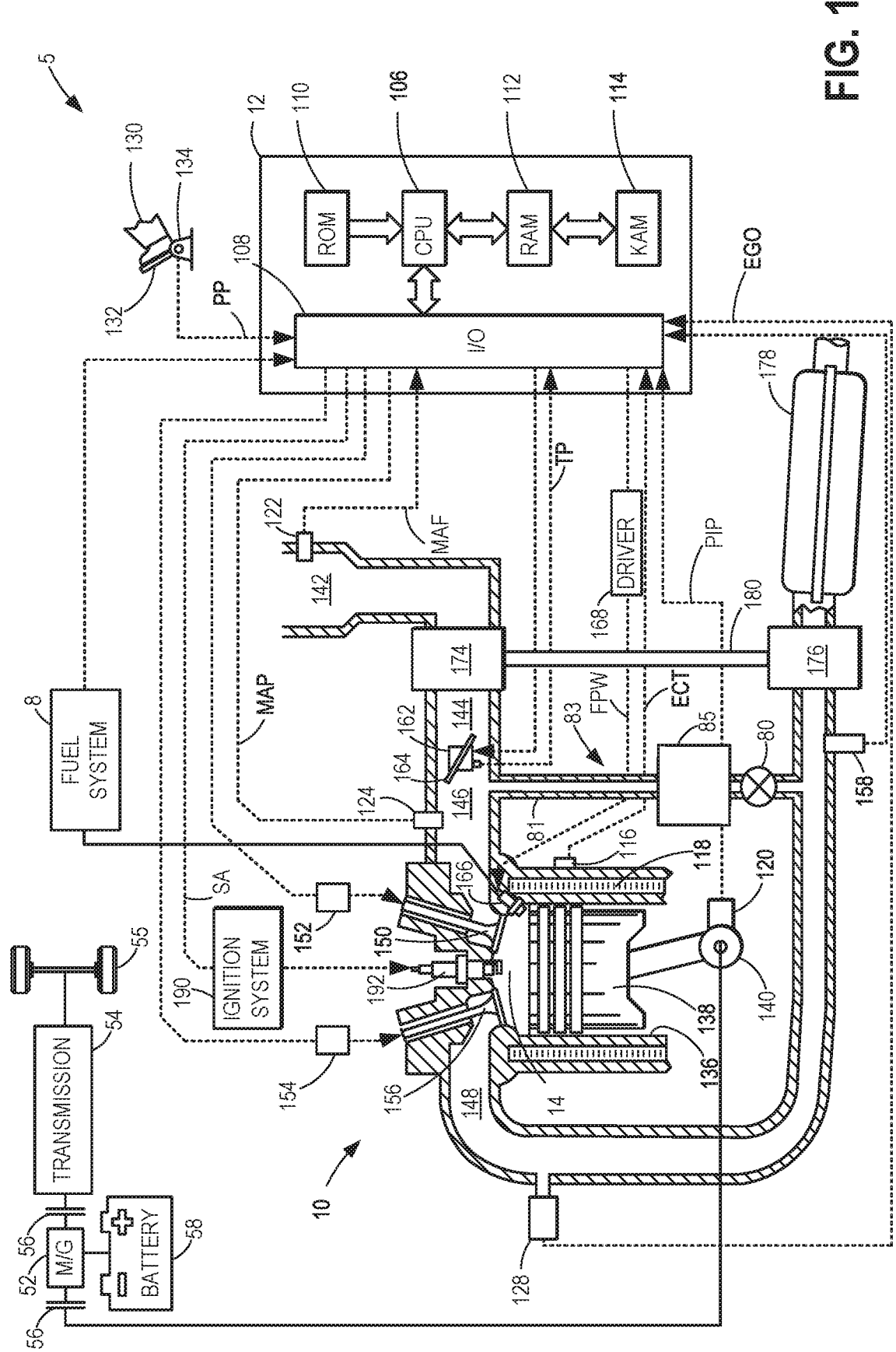
FIG. 1 shows a schematic depiction of an example vehicle system.
Figure 2A:
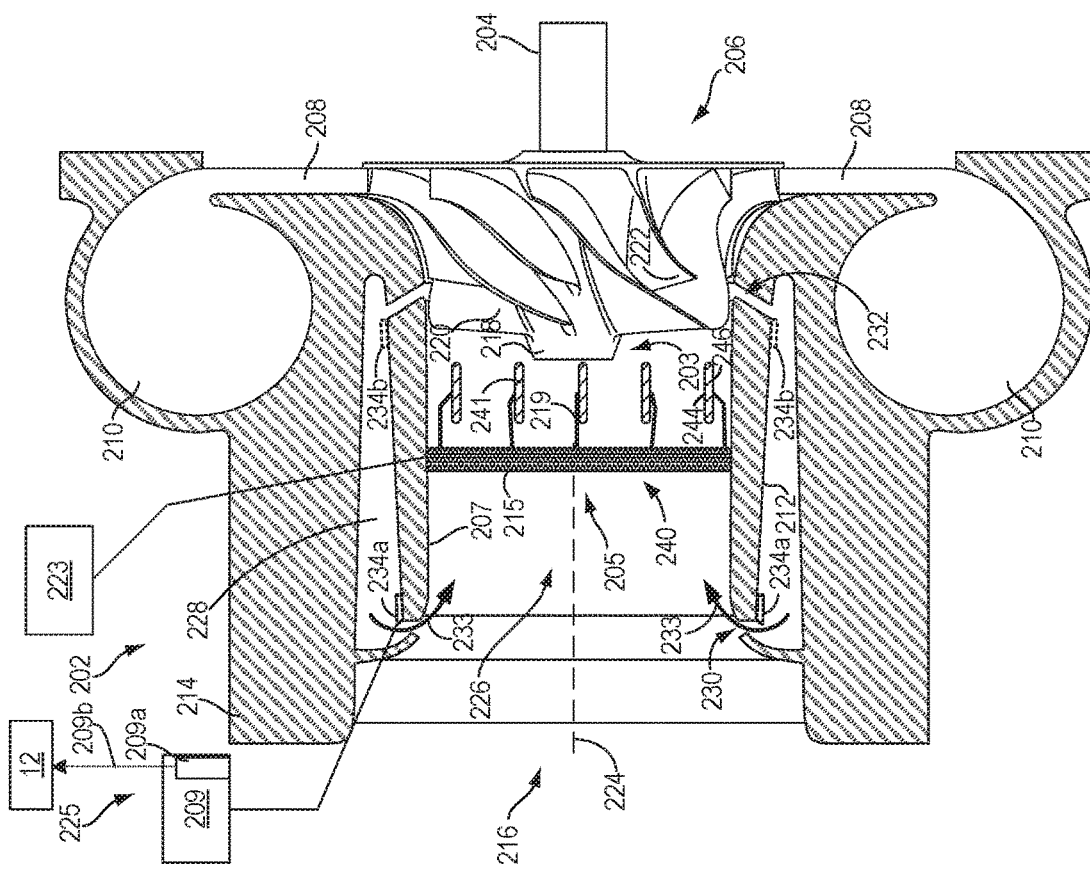
FIGS. 2A-2B show a cut-away view of a first example of a turbocharger compressor including a casing treatment and a variable inlet device positioned in an inlet conduit of the compressor.
Figure 2B:
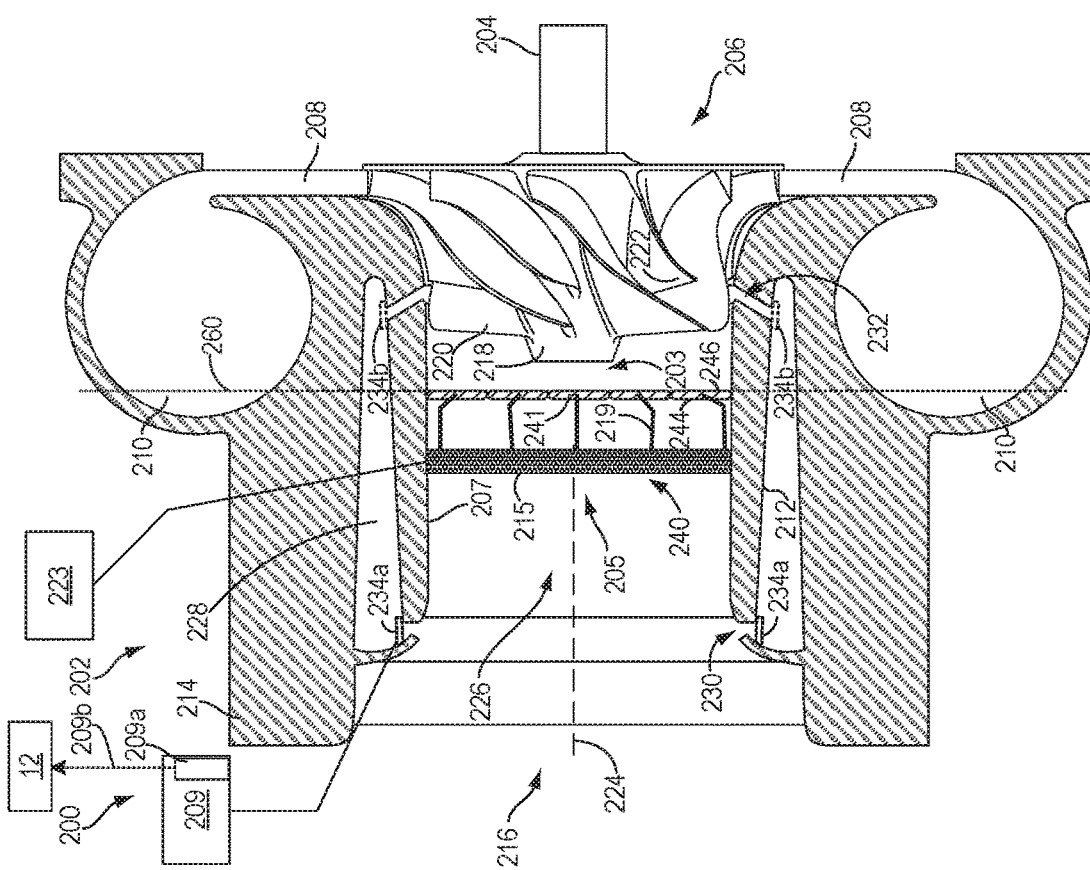
Figure 10:
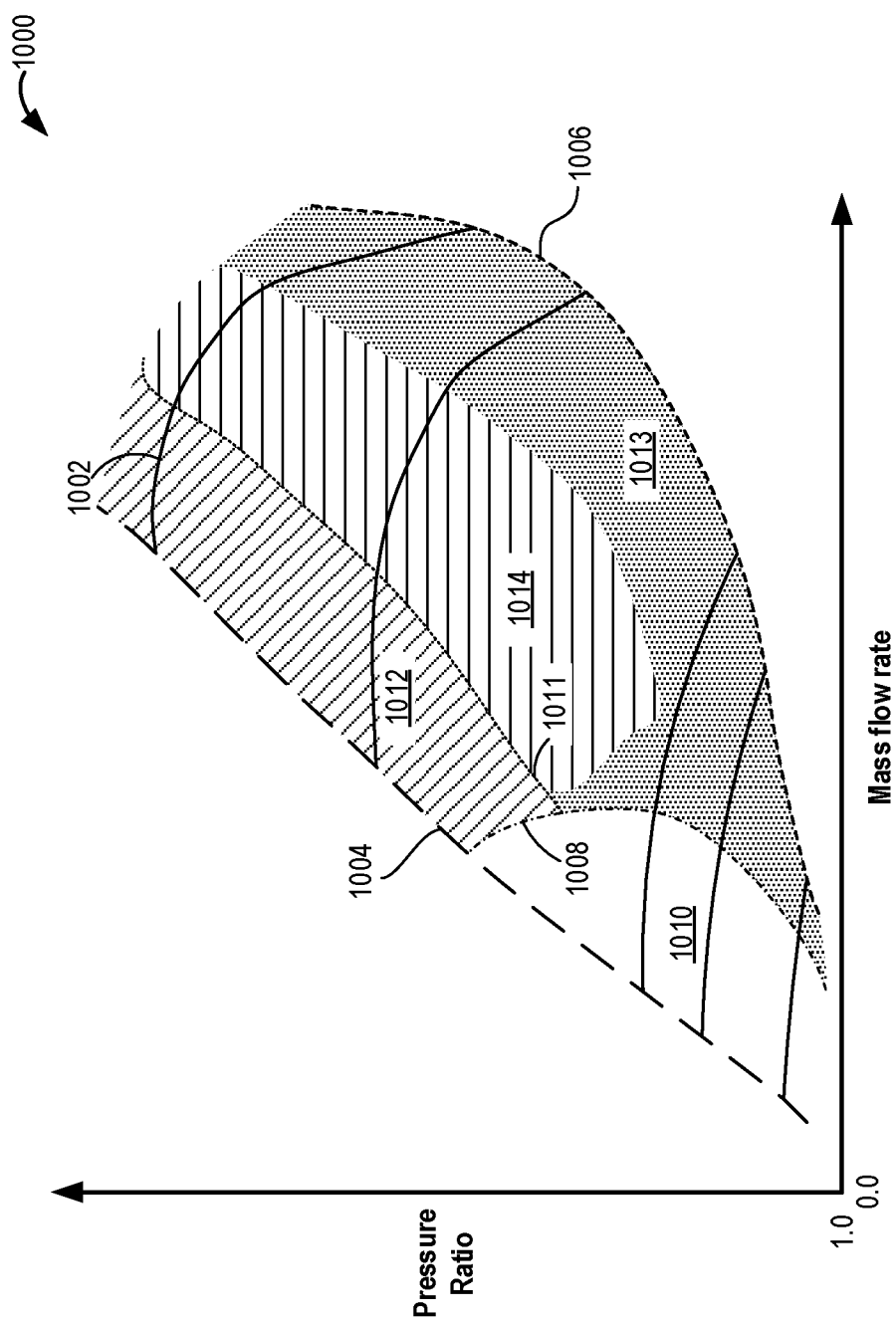
FIG. 10 shows an example compressor map of a compressor having a variable inlet device and an active casing treatment that may be independently actuated.
Figure 11:
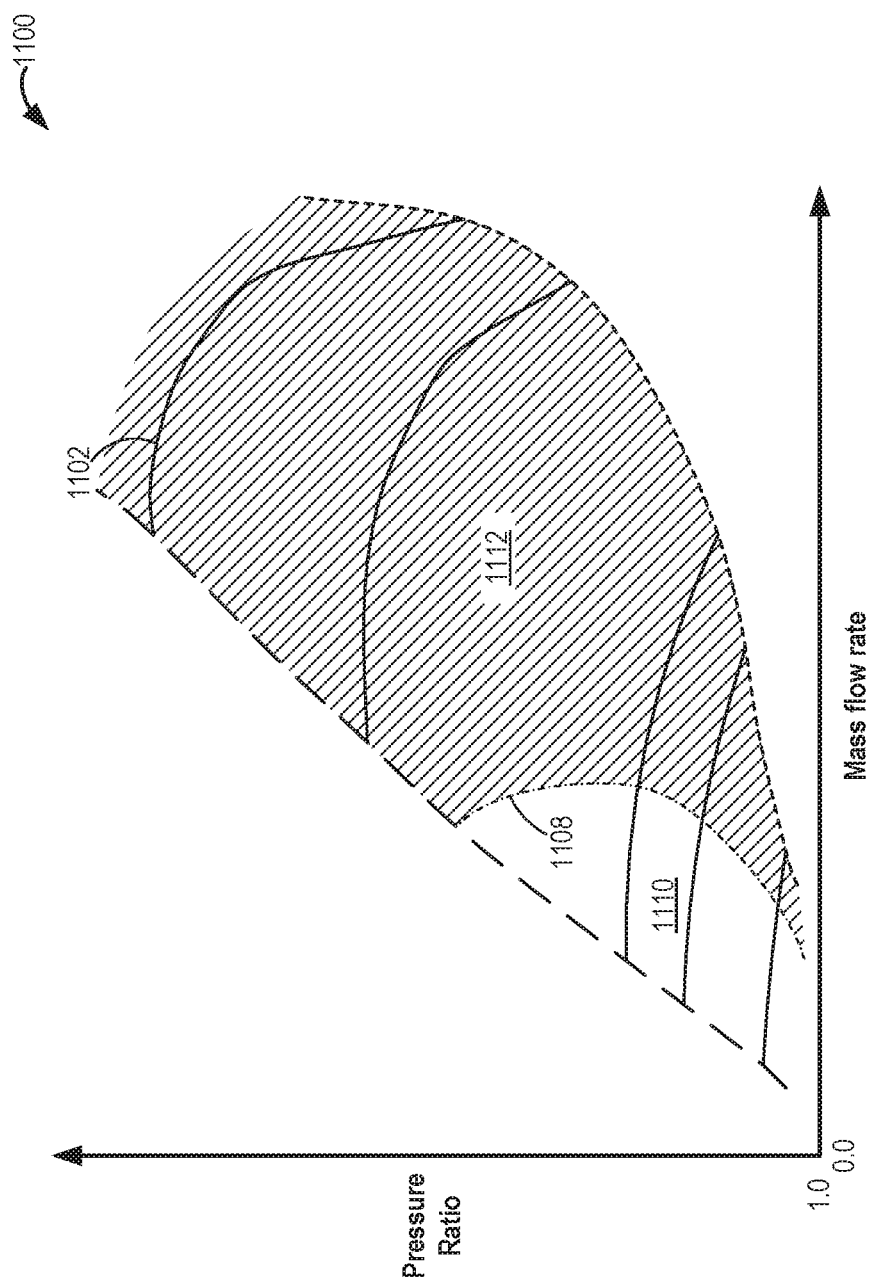
FIG. 11 shows an example compressor map of a compressor having a variable inlet device and an active casing treatment that are actuated via a single actuation system.
Figure 12:
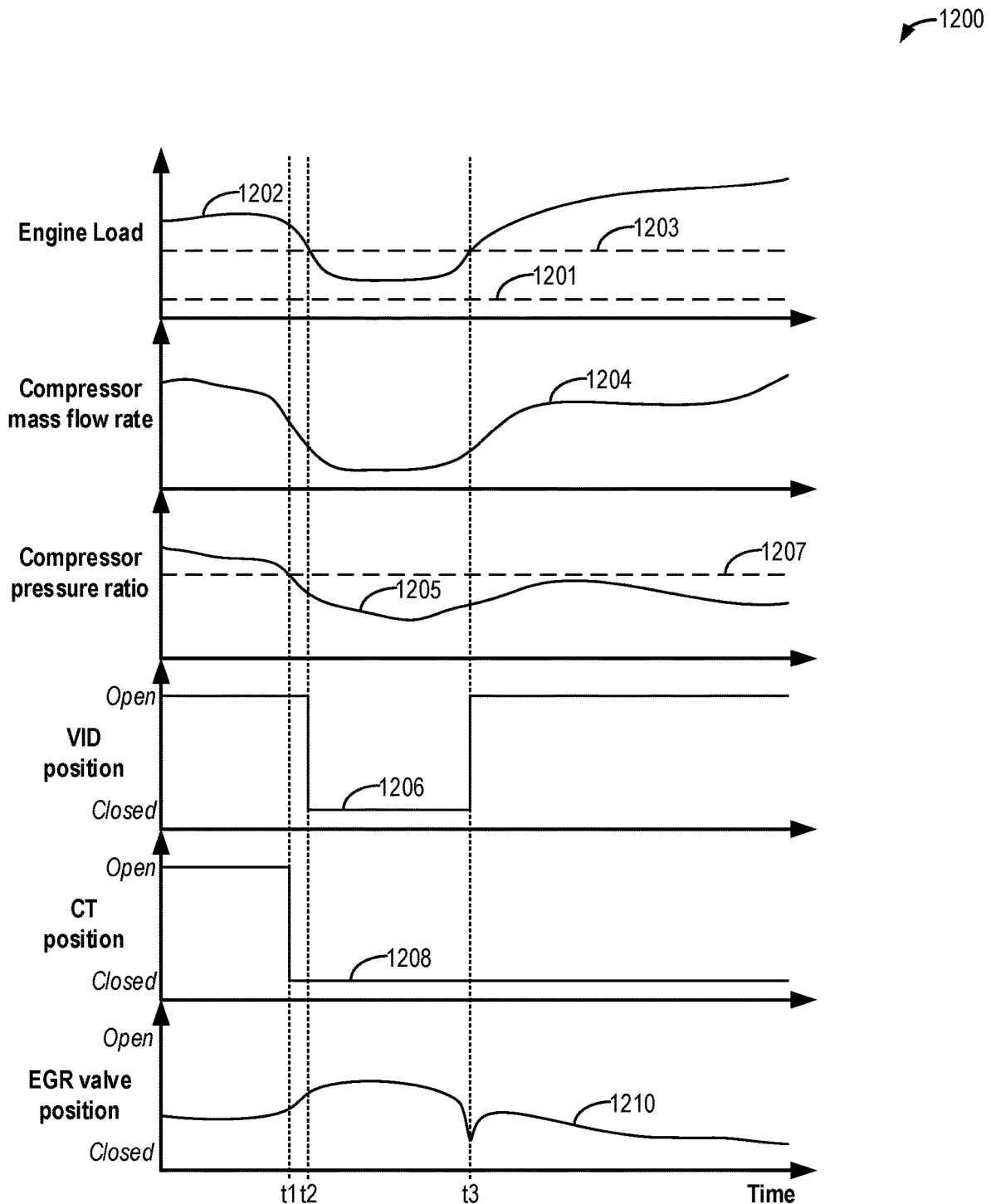
FIG. 12 shows a prophetic example timeline for independently adjusting a position of a variable inlet device and a position of an active casing treatment of a compressor based on engine operating conditions.
Figure 13:
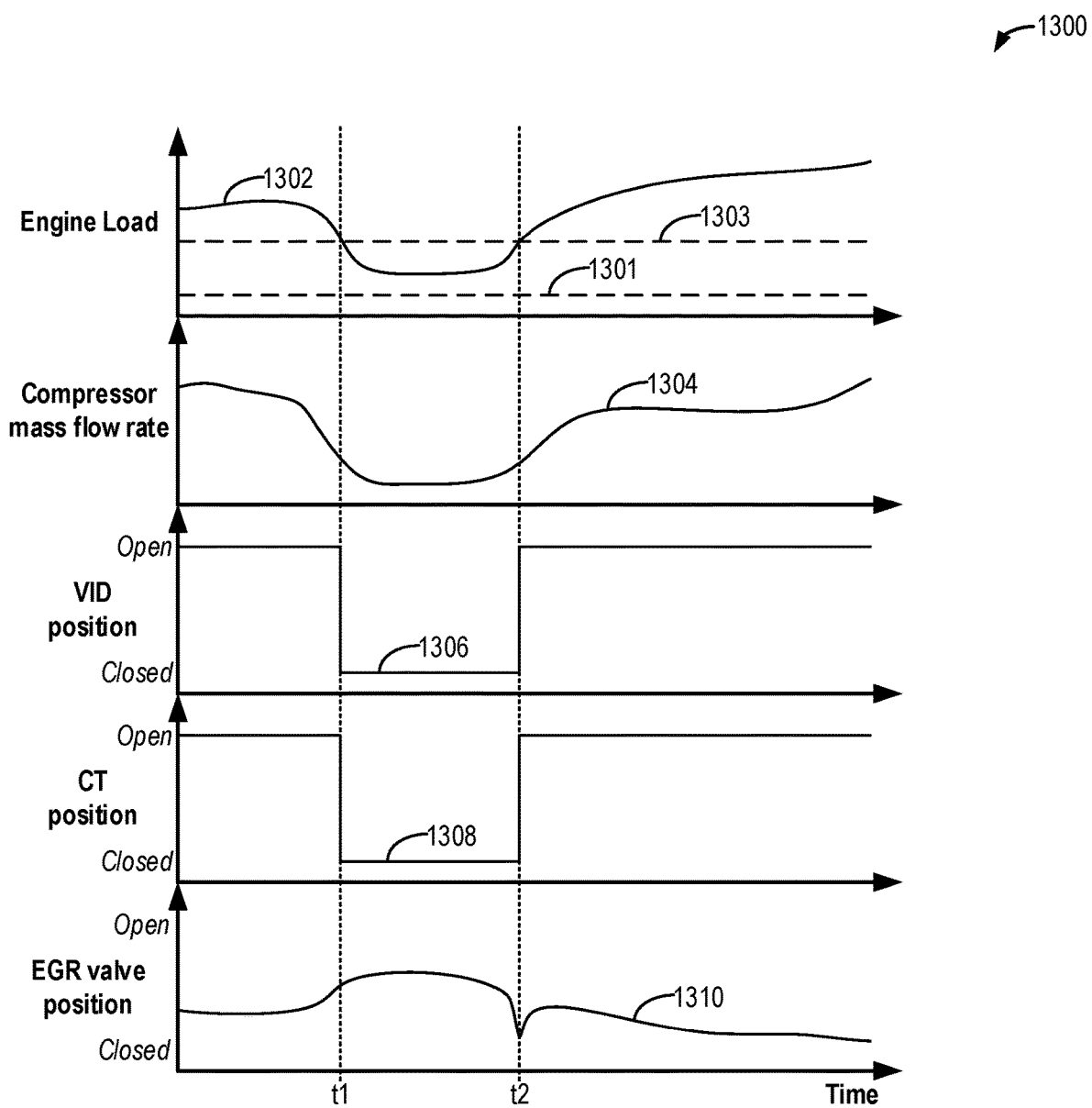
FIG. 13 shows a prophetic example timeline for simultaneously adjusting a position of a variable inlet device and a position of an active casing treatment of a compressor based on engine operating conditions.

The following description relates to systems and methods for a turbocharger compressor having a variable inlet and a casing treatment. The compressor may be positioned in an intake passage of an engine, such as the engine system shown in FIG. 1. The compressor may include an outer casing with an inlet conduit (e.g., intake passage) and an impeller (e.g., compressor wheel) disposed downstream in the inlet conduit. The impeller may include one or more blades and is rotatable about a central axis of the compressor. As shown in FIGS. 2A-2B and FIGS. 4A-4B, a variable inlet device (VID) may be disposed within the inlet conduit of the compressor upstream of the impeller in order to vary an inlet radius (or diameter) of the impeller. The VID may be adjustable between an open position (as shown in FIGS. 2B, 3B, 4B, and 5C) and a closed position (as shown in FIGS. 2A, 3A, 4A, and 5A). In one example, the VID includes vanes that are rotatable along an axis of actuation to vary the effective radius (or diameter) of the VID, as shown in FIGS. 2A-3B. In another example, the VID includes vanes that are moved radially in and out along an actuation axis to vary the radius, as shown in FIGS. 4A-5C. Further, the VID may be used in conjunction with an active casing treatment adapted to adjust recirculation flow between a recirculation port and a bleed port disposed in a wall of the inlet conduit. As shown in FIGS. 4A-5C, in some examples, the VID and the active casing treatment may be controlled by a single actuation system based on engine speed and load conditions, such as according to the example method of FIG. 9. In other examples, such as shown in FIGS. 2A and 2B, the VID and the active casing treatment may be controlled independently based on engine speed and load conditions, such as according to the example methods of FIGS. 6 and 7. An example engine speed and load map is shown in FIG. 8, and example compressor maps are shown in FIGS. 10 and 11. Furthermore, example timelines illustrating control of the VID and the active casing treatment based on engine operating conditions are shown in FIGS. 12 and 13. By including both a VID and an active casing treatment that are controlled based on operating conditions, the compressor efficiency may be increased and a surge margin extended at low engine speeds and loads, increasing fuel economy, while the compressor efficiency is also increased at high engine speeds and loads, increasing engine power.

Turbocharger compressor operating conditions will be referred to throughout the following detailed description and may be clarified in conjunction with a compressor map illustrated in FIG. 10 that shows a mass flow rate through the compressor as a function of a pressure ratio across the compressor. A surge limit delineates a lower limit air flow for compressor operation while a choke limit defines an upper limit air flow. For example, dashed line 1004 represents a lower limit boundary that is the surge limit, and an upper limit boundary, indicated by dashed line 1006, represents the choke limit. Compressor surge may occur during low compressor flow conditions, such as rapid engine unloading events, during which a turbine driving the compressor continues to spin at a relatively high speed, pressurizing the air downstream of the compressor. This leads to a high pressure zone at the outlet of the compressor, driving a reversal in the air flow direction that may cause degradation of the turbocharger. Compressor operation may include a trade-off between avoiding surge and operating with high efficiency. Approaches to extend the surge margin (e.g., move the surge line to the left) may allow additional operation in high efficiency regions without experiencing surge.

Operation beyond the upper limit of compressor pressure ratio relative to mass flow (e.g. in a region to the right of dashed line 1006 defined by relatively high compressor mass flow and relatively low pressure ratio) results in turbocharger choke. Choke may occur during transient overspeed events where, for example, an increase in engine load subjects the turbocharger to flow beyond a tolerance of the turbocharger. The rotational speed of the turbine driving the compressor may be higher than a maximum design speed of the turbocharger. Repeated instances of turbocharger choke may also cause degradation of the turbocharger and/or limit engine torque.

Before further description of the approaches to reduce compressor surge while maintaining or increasing compressor efficiency is provided, an example platform is described, herein the form of a vehicle including an engine, in which the turbocharger of the present disclosure may be installed. Turning now to FIG. 1, an example embodiment of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation.

It will be appreciated that in other embodiments, including non-electric vehicle embodiments, system battery 58 may be a typical starting, lighting, ignition (SLI) battery coupled to an alternator.

Cylinder 14 of engine 10 can receive intake air via a series of intake air passages 142, 144, and 146. Intake air passage 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. In some examples, exhaust turbine 176 may be a variable geometry turbine (VGT) where turbine geometry is actively varied by actuating turbine vanes as a function of engine speed and other operating conditions. In one example, the turbine vanes may be coupled to an annular ring, and the ring may be rotated to adjust a position of the turbine vanes. In another example, one or more of the turbine vanes may be pivoted individually or pivoted in plurality. As an example, adjusting the position of the turbine vanes may adjust a cross sectional opening (or area) of exhaust turbine 176. However, in other examples, such as when engine 10 is provided with a supercharger, compressor 174 may be powered by mechanical input from a motor or the engine and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174. A throttle position sensor may be provided to measure a position of throttle plate 164.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three-way catalyst, a NOx trap, various other emission control devices, or combinations thereof.

Exhaust gas recirculation (EGR) may be provided to the engine via a high pressure EGR system 83, delivering exhaust gas from a zone of higher pressure in exhaust passage 148, upstream of turbine 176, to a zone of lower pressure in intake air passage 146, downstream of compressor 174 and throttle 162, via an EGR passage 81. In other examples (not shown in FIG. 1), low pressure EGR may additionally or alternatively be provided via a low pressure EGR system, coupling a region of exhaust passage 148 between turbine 176 and emission control device 178 to intake air passage 142.

An amount EGR provided to intake passage 146 may be varied by controller 12 via an EGR valve 80. For example, controller 12 may adjust a position of EGR valve 80 to adjust the amount of exhaust gas flowing through EGR passage 81. EGR valve 80 may be adjusted between a fully closed position, in which exhaust gas flow through EGR passage 81 is blocked, and a fully open position in which exhaust gas flow through the EGR passage is enabled. As an example, EGR valve 80 may be continuously variable between the fully closed position and the fully open position. As such, the controller may increase a degree of opening of EGR valve 80 to increase an amount of EGR provided to intake passage 146 and decrease the degree of opening of EGR valve 80 to decrease the amount of EGR provided to intake passage 146. EGR may be cooled via passing through EGR cooler 85 within EGR passage 81. EGR cooler 85 may reject heat from the EGR gases to engine coolant, for example.

Under some conditions, the EGR system may be used to regulate the temperature of the air and fuel mixture within cylinder 14. Thus, it may be desirable to measure or estimate the EGR mass flow. EGR sensors may be arranged within EGR passage 81 and may provide an indication of one or more of mass flow, pressure, and temperature of the exhaust gas, for example. Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples, such as where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in intake passage 146 rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder 14. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol contents, different water contents, different octane numbers, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as Eli) (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. In still another example, fuel tanks in fuel system 8 may hold diesel fuel. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including the signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas pressure from a pressure sensor 158 coupled to exhaust passage 148 upstream of turbine 176; a profile ignition pickup signal (PIP) from a Hall effect sensor 120 (or other type) coupled to crankshaft 140; throttle position (TP) from the throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature.

Controller 12 receives signals from the various sensors of FIG. 1 and employs the various actuators of FIG. 1 to adjust engine operation based on the received signals and instructions stored on a memory of the controller. For example, upon receiving signals from various sensors, the engine controller may send control signals to an actuator to alter the position of a variable inlet device (VID) of the compressor 174 and/or to an actuator of an active casing treatment arranged along an inlet conduit of the compressor 174 (as explained further below with reference to FIGS. 6, 7, and 9). For example, the controller may send an electronic signal to an actuator of the VID to adjust the VID from an open to a closed position or a closed to an open position in response to a current engine speed and engine load relative to a surge threshold of the compressor. In other examples, positions of the VID and the casing treatment may be adjusted simultaneously by a single actuator in response to engine conditions.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

FIGS. 2A-2B show a cut-away view of a first example of a compressor 202 of a turbocharger including an active casing treatment (ACT) and a variable inlet device (VID) 240 positioned in an inlet conduit (e.g., intake passage) of the compressor 202. In one example, compressor 202 may be compressor 174 of FIG. 1. A turbine, such as turbine 176 shown in FIG. 1, may be rotationally coupled to compressor 202 via a shaft 204. Specifically, the turbine converts the energy of the exhaust gas into rotational energy for rotating shaft 204 connected to an impeller 206. Impeller 206 may also be referred to herein as a compressor wheel. Compressor 202 includes impeller 206, diffusers 208, volutes (e.g., compressor chambers) 210, an active casing treatment 212, and casing 214. The rotation of impeller 206 draws gas into compressor 202 through a compressor inlet 216 of casing 214. As non-limiting examples, the gas may include air from an intake passage, exhaust gas (such as when using external exhaust gas recirculation), an air/fuel mix (such as from a fuel vapor canister or the engine crankcase), and combinations thereof. Gas flows from compressor inlet 216 and is accelerated by impeller 206 before flowing through diffuser 208 into volute 210. Diffuser 208 and volute 210 decelerate the gas, causing an increase in pressure in volute 210. Gas under pressure may flow from volute 210 to the intake manifold.

Elements in compressor 202 may be described relative to the direction of the gas flow path through compressor 202. An element substantially in the direction of gas flow relative to a reference point is downstream from the reference point. An element substantially opposite the direction of gas flow relative to a reference point is upstream from the reference point. For example, compressor inlet 216 is upstream from impeller 206, which is upstream from diffuser 208. Diffuser 208 is downstream from impeller 206, which is downstream from compressor inlet 216.

Impeller 206 includes a hub 218 and a plurality of blades, including a full blade 220 and a splitter blade 222. Impeller 206 can also include full blade 220 without splitter blade 222. Full blade 220 and splitter blade 222 are attached to hub 218. The edge of full blade 220 that is most upstream in compressor 202 is the leading edge of full blade 220. Similarly, splitter blade 222 includes a leading edge at the most upstream portion of splitter 222. The leading edge of full blade 220 is upstream of splitter blade 222. Impeller 206 further includes an axis of rotation 224, which is aligned with an axis of rotation for drive shaft 204 and a turbine hub of the turbine (not shown). The axis of rotation 224 is substantially parallel with the flow of gas at the compressor inlet 216 and substantially perpendicular to the flow of gas at the diffuser 208. The axis of rotation 224 may also be referred to herein as a central axis of the compressor 202.

Casing 214 includes compressor inlet 216, an intake passage (also referred to herein as an inlet conduit) 226, recirculation passages 228 (only one of which is labeled), recirculation ports 230 (only one of which is labeled), and bleed ports 232 (only one of which is labeled). Impeller 206 is contained in intake passage 226. Each bleed port 232 is downstream of the leading edge of full blade 220 and upstream of the leading edge of splitter blade 222. Each recirculation port 230 is downstream of compressor inlet 216 and upstream of impeller 206. Recirculation ports 230 are configured to enable gas to flow between recirculation passages 228 and intake passage 226.

Active casing treatment 212 is configured to control gas flow through compressor 202. Specifically, active casing treatment 212, controlled by a controller (e.g., controller 12 shown in FIG. 1), may selectively control the flow of gas through each recirculation passage 228 (which may also be referred to as a casing treatment cavity). For example, during high pressure ratio and low mass flow conditions, active casing treatment 212 may enable gas to flow from intake passage 226, through bleed port 232 into recirculation passage 228, and back into intake passage 226, in the direction of arrows 233 shown in FIG. 2B. Thus, the flow of gas striking the leading edge of full blade 220 may be greater than without bleed port 232. The additional flow of gas may enable the turbocharger compressor to operate with a smaller flow of gas through the compressor before surge occurs (e.g., by increasing a surge margin).

Intake passage 226 may be substantially cylindrical. Recirculation passage 228 may be substantially annular since it is external to and surrounds intake passage 226. The ports connecting intake passage 226 and recirculation passage 228, such as recirculation port 230 and bleed port 232, may each be implemented with various means. For example, the ports may be constructed as one or more holes formed in a wall 207 of (e.g., a wall forming) the intake passage 226. In one example, the wall 207 may be part of the casing 214. As another example, the ports may be constructed as one or more slots extending around the circumference of the intake passage and through a wall of casing that forms the intake passage. The ports may have a uniform or non-uniform width along the length of the port from intake passage 226 to recirculation passage 228. Each port may have a centerline extending along the length of the port from intake passage 226 to recirculation passage 228. The centerline may be normal to the axis of rotation 224 of impeller 206, or the centerline may have a non-zero slope when compared to the axis of rotation of impeller 206.

Active casing treatment 212 may be implemented in many ways. For example, a slidable casing sleeve may be fitted in the recirculation passage to selectively block the flow of gas through recirculation port 230 and/or bleed port 232. The casing sleeve may include one or more holes and/or one or more slots that align with recirculation port 230 and/or bleed port 232 depending on the position of the casing sleeve. In another example, as shown in FIGS. 2A and 2B, a slidable valve may be used to selectively block the flow of gas through recirculation passage 228. For example, a slidable valve 234a may be used to open and close each recirculation passage 228 at recirculation port 230. In an alternative example, a slidable valve 234b may be included to open and close each recirculation passage 228 at bleed port 232 instead of slidable valve 234a. In still another example, slidable valve 234b may be positioned within intake passage 226 instead of within recirculation passage 228, as shown. The positioning of the slidable valve (e.g., at recirculation port 230 or at bleed port 232, within recirculation passage 228 or within intake passage 226) may be selected based on manufacturing constraints, such as packaging constraints. During conditions under which the slidable valve is closed, as further described herein, an efficiency of the compressor may be marginally increased by closing active casing treatment 212 at bleed port 232 (e.g., via slidable valve 234b) compared with closing active casing treatment 212 at recirculation port 230 (e.g., via slidable valve 234a). As an illustrative example, for a same compressor mass flow rate and speed, the efficiency may be approximately 0.700 when active casing treatment 212 is closed via slidable valve 234b and approximately 0.695 when closed via slidable valve 234a. Similarly, the efficiency may be further marginally increased when slidable valve is positioned within intake passage 226 instead of within recirculation passage 228.

FIG. 2A shows slidable valve 234a positioned so that recirculation port 230 is closed (or slidable valve 234b is positioned so that bleed port 232 is closed), thereby preventing airflow to intake passage 226 from recirculation passage 228. The positioning of slidable valve 234a shown in FIG. 2A may be referred to herein as a closed position. FIG. 2B shows slidable valve 234a positioned so that recirculation port 230 is open (or slidable valve 234b is positioned so that bleed port 232 is open), thereby enabling airflow to intake passage 226 from recirculation passage 228, as indicated by arrows 233. The positioning of slidable valve 234a shown in FIG. 2B may be referred to herein as an open position. In this way, the active casing treatment 212 may be adjusted so that air flows through recirculation passage 228 under select operating conditions, as will be further described with respect to FIGS. 7 and 9. Slidable valve 234a (or slidable valve 234b) may be moved between the open and closed positions via an actuator 209, which may be communicatively coupled to a controller (e.g., controller 12 of FIG. 1). Actuator 209 may be electrically or hydraulically actuated and may include an integrated position sensor. For example, the integrated position sensor may supply a position feedback signal representative of actuator position, and thus the position of slidable valve 234a (or slidable valve 234b), to the controller. When the position feedback signal indicates that slidable valve 234a (or slidable valve 234b) has reached the commanded position, the controller may de-energize the actuator 209, for example.

In an alternative example, active casing treatment 212 may be adjusted based on a pressure differential across compressor inlet 216 and an intake manifold downstream of the compressor. In yet another alternative example, active casing treatment 212 may be adjusted based on a pressure differential across the intake manifold and the turbine inlet. In still another alternative example, active casing treatment 212 may be adjusted based on engine load and engine speed conditions (e.g., a current operating speed and load of the engine) in relation to a surge threshold. It will be understood that the examples presented herein are explanatory in nature and the active casing treatment 212 may be adjusted based on other parameters.

As shown in FIGS. 2A-2B, VID 240 is positioned within intake passage 226 immediately upstream of the impeller 206, such that no other components may be placed between VID 240 and impeller 206. In one example, immediately upstream of the impeller refers to VID 240 being positioned upstream of impeller 206 at a distance that is within 25% of a length between bleed port 232 and recirculation port 230. For example, bleed port 232 and recirculation port 230 may be spaced apart by a first length (e.g., 50 mm) and VID 240 may be spaced away from the leading edge of impeller 206 by a second length (e.g., 10 mm), thus VID 240 may be spaced from impeller 206 by a distance that is within 25% (e.g., 20%) of the length separating the bleed port from the recirculation port. In another example, additionally or alternatively, immediately upstream of the impeller refers to VID 240 being positioned upstream of impeller 206 at a distance that is substantially smaller than a diameter of intake passage 226, such as less than one fifth of the diameter of intake passage 226. In still another example, additionally or alternatively, immediately upstream of the impeller refers to VID 240 being positioned proximate to impeller 206 at a distance in a range of 2 to 10 millimeters from the leading edge of impeller 206. Furthermore, a plane of VID 240 may at least partially overlap with a plane of volutes 210. For example, as explained in more detail below, VID 240 may include a plurality of vanes, such as vane 241, and when the vanes are closed (as shown in FIG. 2A), the downstream surface of the vanes (e.g., the second surface 246 facing impeller 206) may form a plane 260 that intersects the volutes. An outlet end 203 of the VID 240 is arranged upstream of the bleed port 232, and an inlet end 205 is arranged downstream of recirculation port 230. The VID 240 spans around an inner circumference of the intake passage 226 and is arranged adjacent to an interior surface of wall 207 of the intake passage 226. For example, an outer diameter of VID 240 may be approximately equal to an inner diameter of intake passage 226 such that an outer perimeter of VID 240 is in face-sharing contact with the interior surface of wall 207. VID 240 includes a plurality of vanes (or blades) 241, each vane 241 coupled to an actuation plate 215 via a pivoting pin and an actuation arm 219. The number of vanes may vary, such as a number in a range from 2 to 15. Each vane 241 has a first surface 244 and a second surface 246, the first surface 244 and the second surface 246 separated by a thickness of the vane and parallel to each other. Each vane 241 also has a length and a width, the width increasing along the length of the vane radially outward, as illustrated with respect to FIG. 3A.

FIG. 2A shows slidable valve 234a positioned so that recirculation port 230 is closed (or slidable valve 234b is positioned so that bleed port 232 is closed), thereby preventing airflow to intake passage 226 from recirculation passage 228. The positioning of slidable valve 234a shown in FIG. 2A may be referred to herein as a closed position. FIG. 2B shows slidable valve 234a positioned so that recirculation port 230 is open (or slidable valve 234b is positioned so that bleed port 232 is open), thereby enabling airflow to intake passage 226 from recirculation passage 228, as indicated by arrows 233. The positioning of slidable valve 234a shown in FIG. 2B may be referred to herein as an open position. In this way, the active casing treatment 212 may be adjusted so that air flows through recirculation passage 228 under select operating conditions, as will be further described with respect to FIGS. 7 and 9. Slidable valve 234a (or slidable valve 234b) may be moved between the open and closed positions via an actuator 209, which may be communicatively coupled to a controller (e.g., controller 12 of FIG. 1). Actuator 209 may be electrically or hydraulically actuated and may include an integrated position sensor 209a. For example, the integrated position sensor 209a may supply a position feedback signal 209b representative of actuator position, and thus the position of slidable valve 234a (or slidable valve 234b), to the controller. When the position feedback signal 209b indicates that slidable valve 234a (or slidable valve 234b) has reached the commanded position, the controller may de-energize the actuator 209, for example.

Under lighter load conditions, VID 240 may be actuated into the closed position by the controller via actuator 223 and actuation plate 215, as shown in FIG. 2A. In the closed position, airflow in front of the leading edge of full blade 220 is blocked. For example, with VID 240 in the closed position, the diameter of intake passage 226 immediately upstream of impeller 206 is restricted, with VID 240 positioned in a smaller radius (e.g., small trim) condition. The outer perimeter of the impeller (e.g., outer edges adjacent to casing 214) does not interact with the air flow, effectively reducing a size of impeller 206. For example, VID 240 may block airflow to 20-40% of impeller 206 when in the closed position. As used herein, the outer perimeter of the impeller refers to the 20-40% of the impeller that is blocked by VID 240 in the small trim condition, while a central portion of the impeller, including hub 218, remains unblocked. As a result, a performance of compressor 202 resembles that of a smaller compressor, and compressor efficiency at low compressor speeds and mass flows is increased. In some examples, active casing treatment 212 may be simultaneously adjusted into a position that prevents airflow through recirculation passage 228, such as by actuating slidable valve 234a to the closed position, further increasing the compressor efficiency compared to when VID 240 and slidable valve 234a are kept in the open position. However, in other examples, VID 240 and active casing treatment 212 may be adjusted at different timings. In still other examples, VID 240 and active casing treatment 212 may be actuated using a single actuation system, as will be described with respect to FIGS. 4A-4B.

For higher engine loads, the VID 240 is actuated to the open position via actuator 223 and actuation plate 215, as shown in FIG. 2B. For example, actuator 223 may be an electronic or hydraulic motor, which may rotate actuation plate 215 and in turn drive VID 240 to close or open via rotation of each actuation arm 219. In the open position, airflow to impeller 206 is unrestricted, with VID 240 positioned in a larger radius (e.g., large trim) condition, enabling higher engine power or torque. In some examples, when VID 240 is opened, active casing treatment 212 may be simultaneously adjusted so that airflow through recirculation passage 228 is enabled (e.g., slidable valve 234a is actuated to the open position), as shown in FIG. 2B. By enabling air to flow through recirculation passage 228, a surge margin of the compressor is extended. However, in other examples, VID 240 and active casing treatment 212 may be adjusted at different timings. By including both of VID 240 and active casing treatment 212 and adjusting their positions based on operating conditions, compressor 202 may be operated at a wide flow range with a high efficiency and an extended surge margin, decreasing fuel consumption and increasing engine power.

Figure 3A:
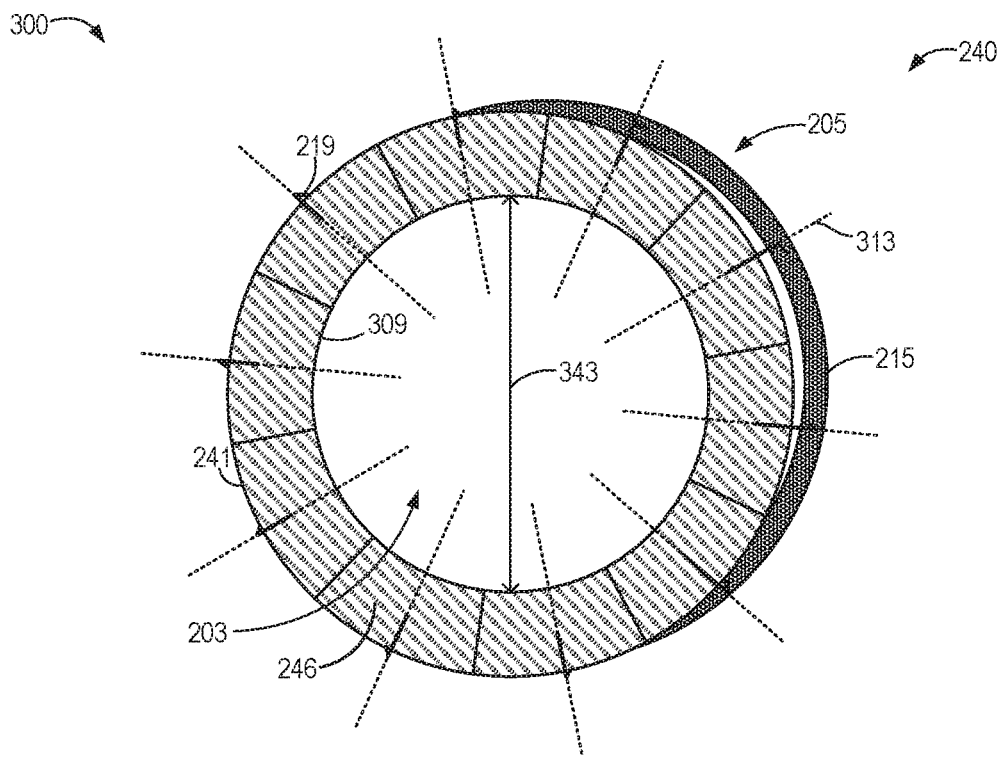
FIGS. 3A-3B show a first example of a variable inlet device for a turbocharger compressor in open and closed positions.
Figure 3B:
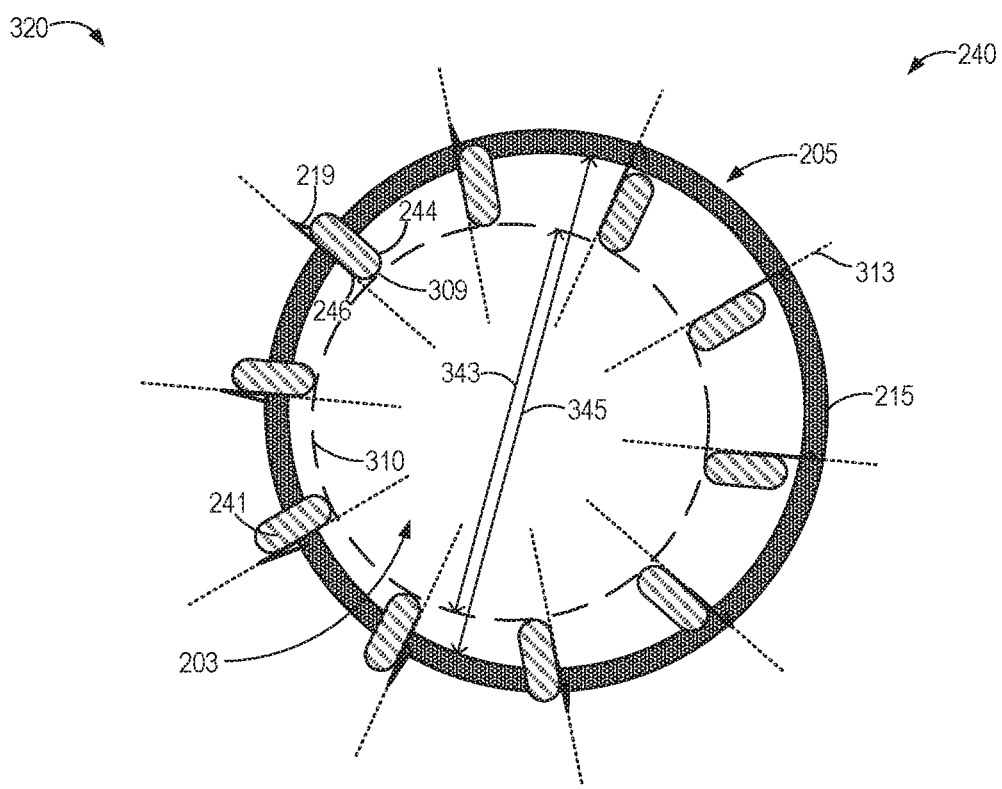

FIGS. 3A-3B show details of VID 240 shown in FIGS. 2A-2B. Specifically, FIG. 3A shows an angled front view 300 of the VID 240 in the closed position, and FIG. 3B shows an angled front view 320 of the VID 240 in the open position. Components of FIGS. 3A-3B that are the same as components in FIGS. 2A-2B are numbered the same and may not be reintroduced.

As shown in FIGS. 3A-3B, VID 240 includes a plurality of adjacently arranged vanes 241 in a ring around a central axis of VID 240, which may be collinear with a central axis of a compressor, such as axis of rotation 224 shown in FIGS. 2A-2B. Inlet end 205 of VID 240, shown going into the page in views 300 and 320, is formed by actuation plate 215. Outlet end 203 of VID 240, shown coming out of the page in views 300 and 320, is formed by interior edges 309 of vanes 241. Gas (e.g., intake air) flowing through a passage in which the VID 240 is positioned (such as the inlet conduits or intake passages shown in FIGS. 2A-2B) contacts the interior edges 309 as it passes through the VID 240. To transition VID 240 between the closed position (FIG. 3A) and the open position (FIG. 3B), each vane 241 is rotated about an actuation axis 313 via the corresponding actuation arm 219. Each actuation axis 313 is arranged radially from the central axis of the compressor.

In the closed position shown in FIG. 3A, the interior edges 309 of vanes 241 form a continuous ring with an inner diameter 343, which serves as a flow passage through VID

240. The edges of vanes 241 may have a tapered shape that allows the adjacent vanes 241 to overlap to reduce the leakage flow through the vanes. With first surface 244 and second surface 246 of each vane 241 positioned perpendicular to the direction of airflow, vanes 241 restrict airflow through VID 240, and a diameter of outlet end 203 is equal to inner diameter 343 in the closed position. Inner diameter 343 may be equal to 60-80% of an outer diameter of VID 240, which may be approximately equal to an inner diameter of an intake passage in which VID is positioned (e.g., intake passage 226 shown in FIGS. 2A and 2B). When VID 240 is in the open position and first surface 244 and second surface 246 of each vane 241 are positioned parallel to the direction of airflow, the ring formed by vanes 241 (indicated by dashed line 310 in FIG. 3B) is no longer continuous. In the open position, vanes 241 restrict airflow through VID 240 to a lesser extent, and the diameter of outlet end 203 is substantially equal to an inner diameter 345 of actuation plate 215, which is greater than inner diameter 343.

Figure 4A:
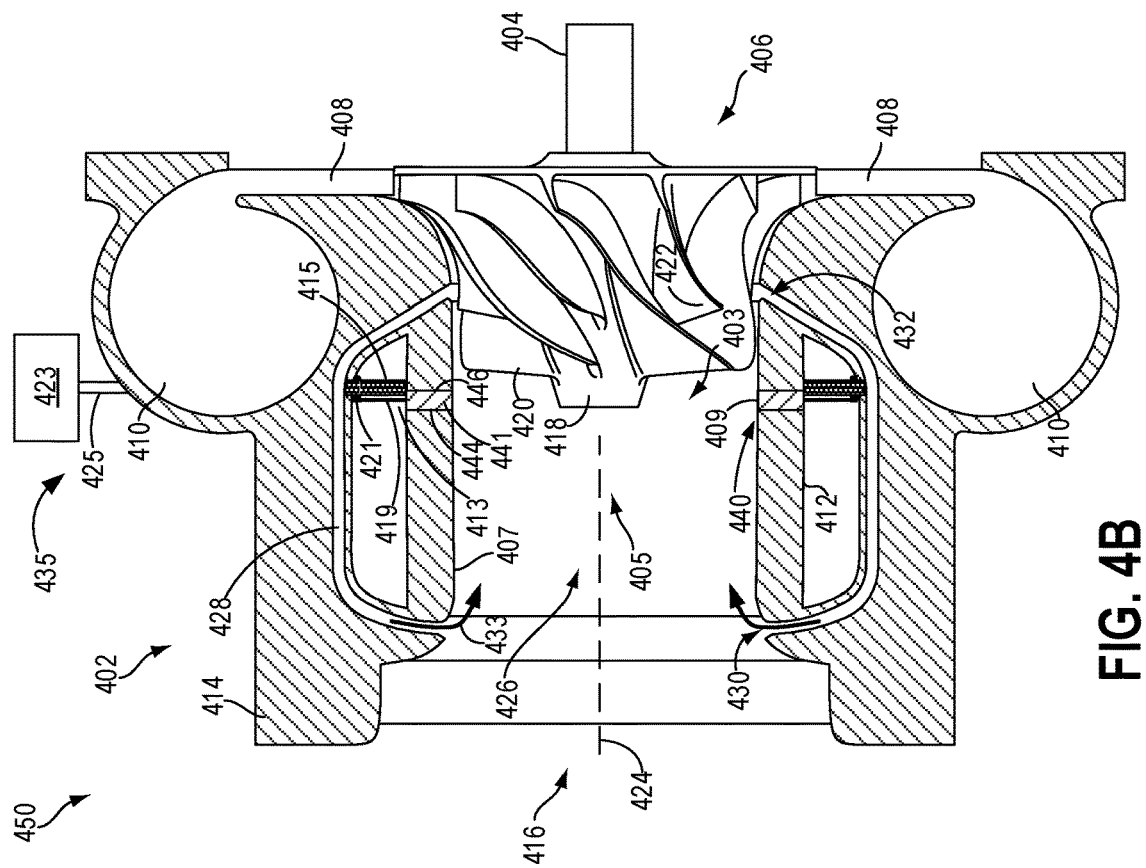
FIGS. 4A-4B show a cut-away view of a second example of a turbocharger compressor including a casing treatment and a variable inlet device positioned in an inlet conduit of the compressor.
Figure 4B:
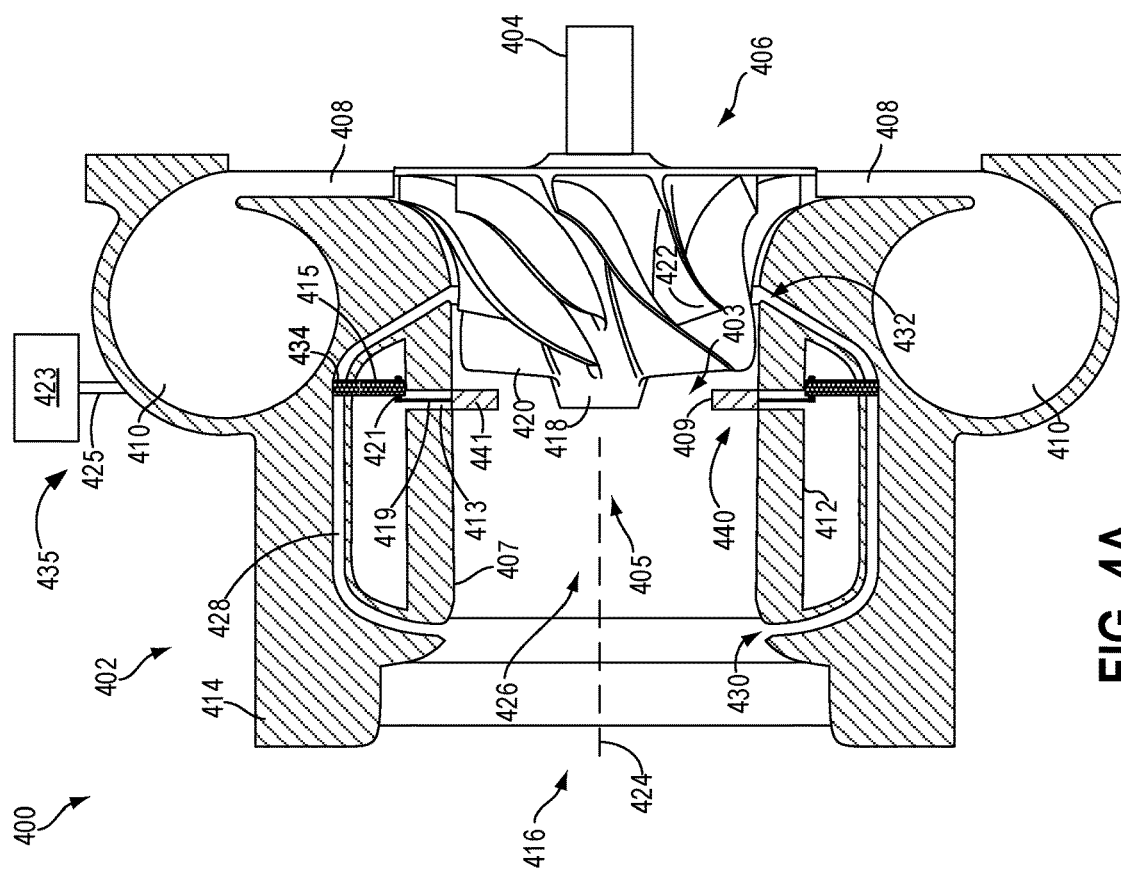

The VID may alternatively be adapted to shift radially in and out of the intake passage of the compressor to adjust an effective flow area of the compressor inlet. FIGS. 4A-4B show a cut-away view of a second example of a compressor 402 of a turbocharger including an ACT and a VID 440 positioned in an inlet conduit (e.g., intake passage) of the compressor 402. In one example, compressor 402 may be compressor 174 of FIG. 1. A turbine, such as turbine 176 shown in FIG. 1, may be rotationally coupled to compressor 402 via a shaft 404. Specifically, the turbine converts the energy of the exhaust gas into rotational energy for rotating shaft 404 connected to an impeller 406. Impeller 406 may also be referred to herein as a compressor wheel. Compressor 402 includes impeller 406, diffusers 408, volutes (e.g., compressor chambers) 410, an active casing treatment 412, and casing 414. The rotation of impeller 406 draws gas into compressor 402 through a compressor inlet 416 of casing 414. As non-limiting examples, the gas may include air from an intake passage, exhaust gas (such as when using external exhaust gas recirculation), an air/fuel mixture, and combinations thereof. Gas flows from compressor inlet 416 and is accelerated by impeller 406 before flowing through diffuser 408 into volute 410. Diffuser 408 and volute 410 decelerate the gas, causing an increase in pressure in volute 410. Gas under pressure may flow from volute 410 to the intake manifold.

Elements in compressor 402 may be described relative to the direction of the gas flow path through compressor 402. An element substantially in the direction of gas flow relative to a reference point is downstream from the reference point. An element substantially opposite the direction of gas flow relative to a reference point is upstream from the reference point. For example, compressor inlet 416 is upstream from impeller 406, which is upstream from diffuser 408. Diffuser 408 is downstream from impeller 406, which is downstream from compressor inlet 416.

Impeller 406 includes a hub 418 and a plurality of blades, including a full blade 420 and a splitter blade 422. Impeller 406 can also include full blade 420 without splitter blade 422. Full blade 420 and splitter blade 422 are attached to hub 418. The edge of full blade 420 that is most upstream in compressor 402 is the leading edge of full blade 420. Similarly, splitter blade 422 includes a leading edge at the most upstream portion of splitter blade 422. The leading edge of full blade 420 is upstream of splitter blade 422. Impeller 406 further includes an axis of rotation 424, which is aligned with an axis of rotation for drive shaft 404 and a turbine hub of the turbine (not shown). The axis of rotation 424 is substantially parallel with the flow of gas at the compressor inlet 416 and substantially perpendicular to the flow of gas at the diffuser 408. The axis of rotation 424 may also be referred to herein as a central axis of the compressor 402.

Casing 414 includes compressor inlet 416, an intake passage (also referred to herein as an inlet conduit) 426, recirculation passages 428 (only one of which is labeled), recirculation ports 430 (only one of which is labeled), and bleed ports 432 (only one of which is labeled). Impeller 406 is contained in intake passage 426. Each bleed port 432 is downstream of the leading edge of full blade 420 and downstream or upstream of the leading edge of splitter blade 422. Each recirculation port 430 is downstream of compressor inlet 416 and upstream of impeller 406. Recirculation ports 430 are configured to enable gas to flow between recirculation passages 428 and intake passage 426.

Active casing treatment 412 is configured to control gas flow through compressor 402. Specifically, active casing treatment 412, controlled by a controller (e.g., controller 12 shown in FIG. 1), may selectively control the flow of gas through each recirculation passage 428 (which may also be referred to as a casing treatment cavity). For example, during high pressure ratio and low mass flow conditions, active casing treatment 412 may enable gas to flow from intake passage 426, through bleed port 432 into recirculation passage 428, and back into intake passage 426, in the direction of arrows 433 shown in FIG. 4B. Thus, the flow of gas striking the leading edge of full blade 420 may be greater than without bleed port 432. The additional flow of gas may enable the turbocharger compressor to operate with a smaller flow of gas through the compressor before surge occurs (e.g., by increasing a surge margin).

Intake passage 426 may be substantially cylindrical. Recirculation passage 428 may be substantially annular since it is external to and surrounds intake passage 426. The ports connecting intake passage 426 and recirculation passage 428, such as recirculation port 430 and bleed port 432, may each be implemented with various means. For example, the ports may be constructed as one or more holes formed in a wall 407 of (e.g., a wall forming) the intake passage 426. In one example, the wall 407 may be part of the casing 414. As another example, the ports may be constructed as one or more slots extending around the circumference of the intake passage and through a wall of casing that forms the intake passage. The ports may have a uniform or non-uniform width along the length of the port from intake passage 426 to recirculation passage 428. Each port may have a centerline extending along the length of the port from intake passage 426 to recirculation passage 428. The centerline may be normal to the axis of rotation 424 of impeller 406, or the centerline may have a non-zero slope when compared to the normal to the axis of rotation of impeller 406.

Active casing treatment 412 and VID 440 may be adjusted using a suitable actuator. As shown in FIGS. 4A and 4B, airflow through both active casing treatment 412 and VID 440 is controlled by a single actuation system 435, as will be further described with respect to FIGS. 5A-5C. A common actuator 423, which may be a motor, for example, adjusts a position of a unison ring 415 via a shaft 425. Unison ring 415 may be driven electronically or hydraulically by common actuator 423. Unison ring 415 includes a plurality of valves 434, a number of valves 434 corresponding to a number of recirculation passages 428, and a plurality of slots (not visible in FIGS. 4A and 4B), a number of slots corresponding to a number of vanes 441 of VID 440. Each vane 441 is coupled to a slot of unison ring 415 via an arm 419 and a pin 421. FIG. 4A shows a first schematic 400 with the VID adjusted (e.g., actuated) into a closed position and airflow through each recirculation passage 428 blocked by valves 434 of unison ring 415, as will be further described below with reference to FIG. 5A, while FIG. 4B shows a second schematic 450 with the VID adjusted (e.g., actuated) into an open position and airflow through each recirculation passage 428 enabled, as will be further described below with reference to FIG. 5C.

Common actuator 423 may include an integrated position sensor. For example, the integrated position sensor may supply a position feedback signal representative of actuator position, and thus the position of vanes 441 and valves 434, to the controller. Because vanes 441 and valves 434 are actuated together via the common actuator 423 and the unison ring 415, a single feedback signal may be used to determine that both of the vanes 441 and the valves 434 are moving as commanded. When the position feedback signal indicates that vanes 441 and valves 434 have reached the commanded position, the controller may de-energize the common actuator 423, for example.

As shown in FIGS. 4A-4B, VID 440 is positioned within intake passage 426 immediately upstream of the impeller 406, such that no other components may be placed between VID 440 and impeller 406. In one example, immediately upstream of the impeller refers to VID 440 being positioned upstream of impeller 406 at a distance that is within 25% of a length between bleed port 432 and recirculation port 430. In another example, additionally or alternatively, immediately upstream of the impeller refers to VID 440 being positioned upstream of impeller 406 at a distance that is substantially smaller than a diameter of intake passage 426, such as less than one fifth of the diameter of intake passage 426. In still another example, additionally or alternatively, immediately upstream of the impeller refers to VID 440 being positioned proximate to impeller 406 at a distance in a range of 2 to 10 millimeters from the leading edge of impeller 406. Furthermore, a plane of VID 440 may at least partially overlap with a plane of volutes 410. An outlet end 403 of the VID 440 is arranged upstream of the bleed port 432, and an inlet end 405 is arranged downstream of recirculation port 430. The number of vanes 441 may vary, such as a number in a range from 2 to 15. Each vane 441 has a first surface 444 and a second surface 446, the first surface 444 and the second surface 446 separated by a thickness of the vane and parallel to each other. The first surface 444 is an upstream, inlet surface of each vane 441, and the second surface 446 is a downstream, outlet surface of each vane. The first surface 444 and the second surface 446 of each vane 441 are substantially perpendicular to the central axis of the compressor 424 and the direction of gas flow at compressor inlet 416. Each vane 441 also has a length and a width, the width increasing along the length of the vane radially outward, as illustrated with respect to FIG. 4A.

Under lighter load conditions, VID 440 may be actuated into the closed position by the controller via actuator 423 rotating unison ring 415 to a first position shown in FIG. 4A and further described with respect to FIG. 5A. When VID 440 is in the closed position, vanes 441 protrude into intake passage 426 via a cavity 413 within active casing treatment 412. Vanes 441 may be positioned adjacent to inner wall 407 such that no air flows between vanes 441 and inner wall 407. In some examples, vanes 441 may extend into cavity 413 to reduce air leakage into cavity when in the closed position. In the closed position, airflow in front of the leading edge of full blade 420 is blocked. For example, with VID 440 in the closed position, the diameter of intake passage 426 immediately upstream of impeller 406 is restricted, with VID 440 positioned in a smaller radius (e.g., small trim) condition. The perimeter of the impeller (e.g., outer edges adjacent to casing 414) does not interact with the air flow, effectively reducing a size of impeller 406. For example, VID 440 may block airflow to 20-40% of impeller 406 when in the closed position, the blocking occurring at the outer 20-40% of the impeller and not the center of the impeller. As a result, compressor efficiency at low compressor speeds and mass flows is increased. At the same time, the rotation of unison ring 415 to the first, closed position places valves 434 such that airflow is prevented through each recirculation passage 428, further increasing the compressor efficiency compared to when VID 440 is closed and active casing treatment 412 is open (e.g., recirculation passage 428 is open). Active casing treatment 412 may be referred to herein as in a closed position when airflow through each recirculation passage 428 is blocked by valves 434, such as shown in FIG. 4A.

For higher engine loads, VID 440 is actuated to the open position by the controller via actuator 423 rotating unison ring 415 to a second position shown in FIG. 4B and further described with respect to FIG. 5C (a number of intermediate positions may exist between the first position and the second position, such as will be described with respect to FIG. 5B). The rotation of unison ring 415 retracts vanes 441 into cavity 413 such that vanes 441 no longer protrude into intake passage 426 and are positioned within walls of active casing treatment 412. In the open position, airflow to impeller 406 is unrestricted, with VID 440 positioned in a larger radius (e.g., large trim) condition, enabling higher engine power or torque. For example, interior edges 409 of vanes 441 may be flush with inner wall 407. At the same time, the rotation of unison ring 415 to the second, open position rotates valves 434 out of each recirculation passage 428 such that airflow through the recirculation passages is enabled, extending a surge margin of compressor 402 compared to when airflow through the recirculation passages is blocked. (Valves 434 are not visible in the view of FIG. 4B, as they have been rotated out of the plane of second schematic 450.) Active casing treatment 412 may be referred to herein as in an open position when airflow through each recirculation passage 428 is enabled, such as shown in FIG. 4B.

By including both of VID 440 and active casing treatment 412 under control of a common actuator 423, compressor 402 may be operated at a wide flow range with a high efficiency and an extended surge margin, decreasing fuel consumption and increasing engine power. In this way, active casing treatment 412 and VID 440 may be simultaneously adjusted so that air flows through recirculation passage 428 under select operating conditions and impeller 406 has a reduced effective size under other operating conditions, as will be further described with respect to FIG. 9. As an example, active casing treatment 412 and VID 440 may be simultaneously adjusted based on a pressure differential across compressor inlet 416 and an intake manifold downstream of the compressor. In another example, active casing treatment 412 and VID 440 may be simultaneously adjusted based on a pressure differential across the intake manifold and the compressor inlet. In still another example, active casing treatment 412 and VID 440 may be simultaneously adjusted based on engine load and engine speed conditions (e.g., a current operating speed and load of the engine) in relation to a surge thresholds. It will be understood that the examples presented herein are explanatory in nature and other examples are possible. Furthermore, by using the common actuation system, only one position sensor is needed to determine whether each of the VID and active casing treatment are moving into commanded positions as expected.

FIGS. 5A-5C show details of VID 440 and unison ring 415 of FIGS. 4A-4B. Specifically, FIG. 5A shows a front view 500 of VID 440 and active casing treatment 412 in the closed position, FIG. 5B shows a front view 510 of VID 440 and active casing treatment 412 in an intermediate position, and FIG. 5C shows a front view 520 of VID 440 and active casing treatment 412 in the open position. Components of FIGS. 5A-5C that are the same as components in FIGS. 4A-4B are numbered the same and may not be reintroduced.

As shown in FIGS. 5A-5B, VID 440 includes a plurality of adjacently arranged vanes 441 in a ring around a central axis of VID 440, which may be collinear with a central axis of a compressor, such as axis of rotation 424 shown in FIGS. 4A-4B. Inlet end 405 of VID 440 is shown going into the page in views 500, 510, and 520, and outlet end 403 of VID 440 is shown coming out of the page in views 500, 510, and 520. Gas (e.g., intake air) flowing through a passage in which the VID 440 is positioned (such as the inlet conduits or intake passages shown in FIGS. 4A-4B) contacts the interior edges 409 as it passes through the VID 440. Thus, interior edges 409 form a flow passage through VID 440.

In the closed position shown in FIG. 5A, the interior edges 409 of vanes 441 form a continuous ring with an inner diameter 543. Inner diameter 543 may be equal to 60-80% of an inner diameter of an intake passage in which VID 440 is positioned (e.g., intake passage 426 shown in FIGS. 4A and 4B) when VID 440 is in the open position. The interior edges 409 of the vanes 441 may have a tapered shape so that adjacent vanes 411 may overlap to avoid leakage. To transition VID 440 and active casing treatment 412 between the closed position (FIG. 5A) and the open position (FIG. 5C), each vane 441 of VID 440 is retracted into cavity 413 by rotating unison ring 415 via common actuator 423 and shaft 425. For example, common actuator 423 may be a stepper motor that laterally moves shaft 425. The lateral movement of shaft 425 rotates unison ring 415. As unison ring 415 is rotated, slots 417 move with respect to arm 419 and pin 421 of each vane 441, which may be translatable in a radial direction. As a result, pin 421 slides along slot 417, pulling vane 441 radially outward to increase inner diameter 543. For example, as shown in FIG. 5B, when VID 440 and active casing treatment 412 are in the intermediate position, vanes 441 are partially retracted into cavity 413. At the same time, the rotation of unison ring 415 moves valves 434 such that recirculation passages 428 are partially opened. Note that while two recirculation passages 428 (and two corresponding valves 434) are shown, any number of recirculation passages are possible, which may be symmetrically or asymmetrically distributed about the central axis of the compressor. When VID 440 is in the open position and vanes 441 are fully retracted into cavity 413, inner diameter 543 is at a maximum, which is equal to a diameter of inner wall 407, as shown in FIG. 5C. When active casing treatment 412 is in the open position, valves 434 no longer overlap or obstruct recirculation passages 428, as also shown in FIG. 5C.

In some examples, the intermediate position shown in FIG. 5B may be transitory, and VID 440 and active casing treatment 412 may be operated in only the open (e.g., fully open) and the closed (e.g., fully closed) positions. In other examples, VID 440 and active casing treatment 412 may be continuously variable between the fully open and fully closed positions, with a controller selecting a position of the unison ring that will result in a desired partially open position based on operating conditions.

FIGS. 2A-5C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 6:
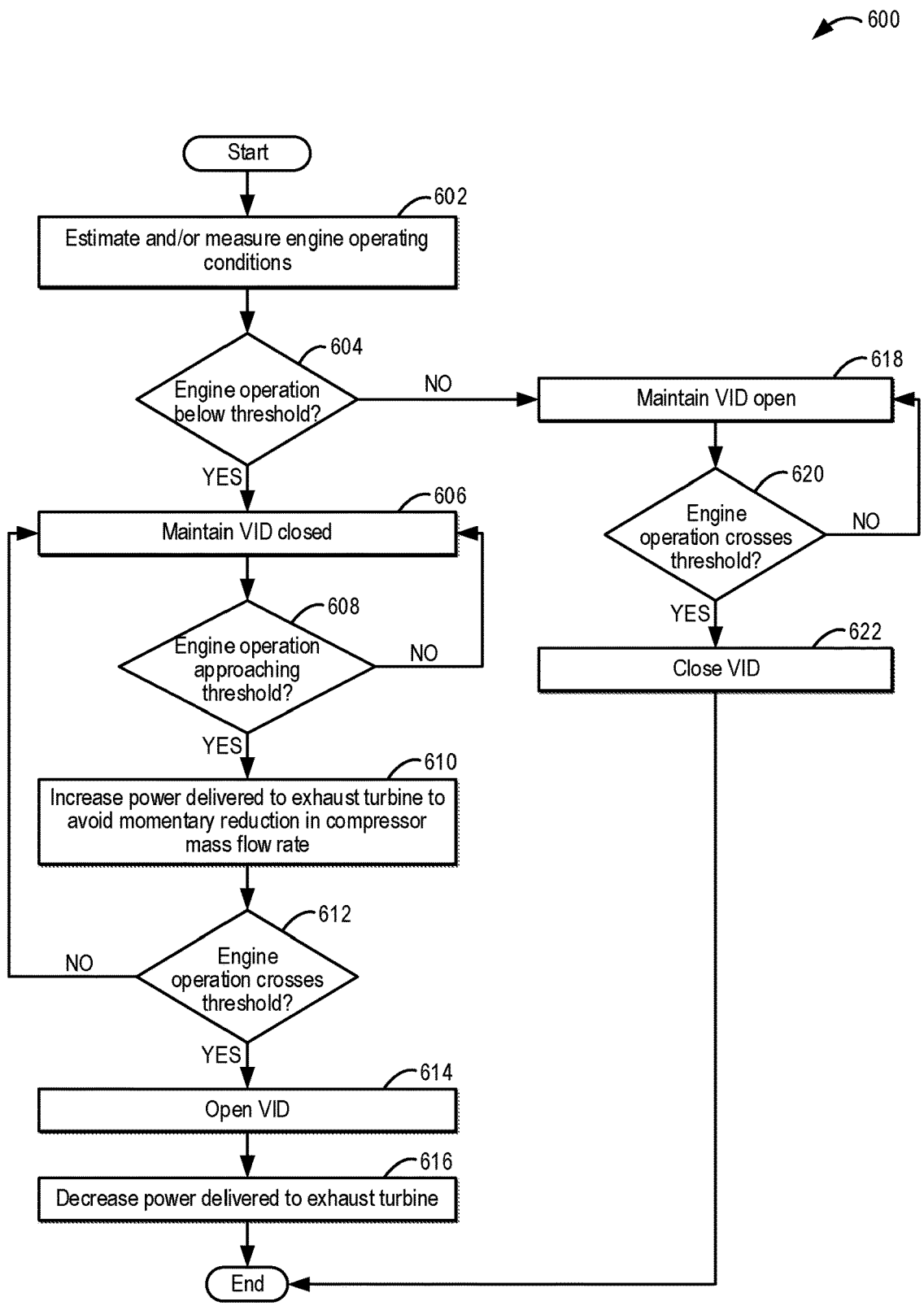
FIG. 6 shows a flow chart of an example method for controlling a position of a variable inlet device.

Turning to FIG. 6, a flow chart of an example method 600 for controlling operation (e.g., controlling a position) of a variable inlet device positioned in an inlet conduit of a turbocharger compressor is shown. Specifically, the variable inlet device (VID) may be VID 240 shown in FIGS. 3A-3B and may be included in an engine system, such as the system of engine 10 shown in FIG. 1. The VID may be positioned in an inlet conduit of a compressor, upstream of an impeller, such as shown in FIGS. 2A-2B. As also shown in FIGS. 2A-2B, in some examples, the compressor may additionally include a casing treatment including a recirculation passage. Instructions for carrying out method 600 and the rest of the methods included herein may be executed by a controller (e.g., controller 12 shown in FIG. 1) based on instructions stored on a memory of the controller and in conjunction with signals received from sensors of the engine system, such as the sensors described above with reference to FIG. 1. The controller may employ engine actuators of the engine system (e.g., EGR valve 80 of FIG. 1) to adjust engine operation according to the methods described below. For example, the controller may employ an actuator of the VID (e.g., actuator 223 shown in FIGS. 2A and 2B) to adjust the VID between an open position (as shown in FIGS. 2B and 3B) and a closed position (as shown in FIGS. 2A and 3A).

Method 600 begins at 602 and includes estimating and/or measuring engine operating conditions. Engine operating conditions may include engine speed, engine load, engine temperature (such as inferred from an engine coolant temperature measured by an engine coolant temperature sensor), mass air flow (e.g., as measured by a MAF sensor, such as MAF sensor 122 of FIG. 1), intake manifold pressure (e.g., as measured by a MAP sensor, such as MAP sensor 124 of FIG. 1), a pressure differential across a compressor, a mass air flow rate through the compressor, a speed of the compressor, a position of the VID, exhaust pressure (e.g., as measured by exhaust pressure sensor 158), etc. The operating conditions may be measured or inferred based on available data.

At 604, method 600 includes determining whether the engine is operating below a threshold. Operating below the threshold may include a current (e.g., currently determined) engine speed and engine load being below the threshold. In one example, the threshold may be a pre-set threshold stored in a map or look-up table in a memory of the controller. Turning briefly to FIG. 8, an example map 800 of engine load (vertical axis) vs. engine speed (horizontal axis) is shown. Map 800 includes an operational boundary line 802. All of the possible engine speed and engine load operational points of the engine may be contained within the axes and operational boundary line 802. The map 800 also includes a surge threshold 804. When the engine is operating at an engine speed and engine load point that falls below, or to the left of, the surge threshold 804, such as in a first area 806, the likelihood of compressor surge may be increased relative to when the engine is operating at an engine speed and engine load point that falls above, or to the right of, the surge threshold 804, such as in a second area 808.

In the second area 808 of engine map 800, a threshold 805 divides the second area 808 into a high load region 808a and a low load region 808b. The high load region 808a is to the right of the threshold 805 and comprises engine loads and speeds higher than those defined by the threshold 805. Peak torque engine operation is included in high load region 808a, and the VID and the active casing treatment may be adjusted to provide increased flow through the compressor to enable the peak torque engine operation as well as surge mitigation. In the low load region 808b, engine loads and speeds are lower than those defined by the threshold 805 and may correspond to idling or cruising operations of the vehicle. Thus, in this region, a capacity for peak torque engine operation is not needed, and the VIC and the active casing treatment may be adjusted into positions to decrease mass flow into the compressor while increasing compressor efficiency and therefore engine fuel economy.

Additionally or alternatively, the controller may refer to a map or look-up table of compressor conditions, such as the differential pressure across the compressor and/or the mass air flow through the compressor to compare the operating conditions of the compressor to the surge threshold. An example of such a compressor map 1000 in shown in FIG. 10.

The horizontal axis of compressor map 1000 represents a mass flow rate of the compressor, with values increasing from left to right, while the vertical axis represents a pressure ratio across the compressor (e.g., an output pressure divided by an input pressure), with values increasing from bottom to top. Compressor map 1000 includes a plurality of compressor speed lines 1002, a surge limit 1004, and a choke limit 1006. The surge limit 1004 represents where the compressor operation may lose stability and exhibit surge behavior, ranging from whoosh noise to violent oscillations of flow. Choke limit 1006 represents the highest possible mass flow rate at a given pressure ratio. An area between the surge limit 1004 and the choke limit 1006 represents a region of stable compressor operation, which may correspond to the second area 808 of the engine map 800 of FIG. 8.

A first threshold 1008 may separate a first compressor map region 1010 of low mass flow and low pressure ratios within the region of stable operation from regions of compressor map 1000 of compressor operation at higher mass flows and higher pressure ratios. The compressor operation at higher mass flows and higher pressure ratios may be further subdivided into a second compressor map region 1012, a third compressor map region 1013, and a fourth compressor map region 1014. Boundaries between each of the first, second, third, and fourth compressor map regions 1010, 1012, 1013, and 1014, respectively, may be defined by adjustments in the VID and active casing treatment positioning to accommodate compressor operation, as will be further described herein.

The first threshold 1008 may correspond to the threshold 805 of engine map 800 of FIG. 8. A second threshold 1011 may at least partially separate the second compressor map region 1012 and the third compressor map region 1013. A fourth compressor map region 1014, corresponding to a peak efficiency region, may be positioned between the second compressor map region 1012 and the third compressor map region 1013 and may be separated from the second compressor map region 1012 by the second threshold 1011. Compressor operation in the first compressor map region 1010 may represent driving conditions where peak torque operation of the engine is not demanded and conversely, operation in one of the second compressor map region 1012, the third compressor map region 1013, and the fourth compressor map region 1014 may include peak torque engine operation. The second compressor map region 1012, the third compressor map region 1013, and the fourth compressor map region 1014 will be further described with respect to FIG. 7.

Returning to FIG. 6, if the engine is operating below the threshold (e.g., the current engine speed and load operating point is in the low load region 808b shown in map 800 and/or to the left of first threshold 1008 in compressor map 1000 of FIG. 10), method 600 continues to 606 and includes maintaining the VID closed. Because the engine is already operating below the threshold, which corresponds to operation with the VID closed, it is expected that the VID will already be in the closed position. The closed position of the VID is shown in FIGS. 2A and 3A, as described above. As explained above with reference to FIGS. 2A and 3A, in the closed position, interior edges of the VID reduce a diameter of the intake passage immediately upstream of the impeller.

At 608, method 600 includes determining if the engine operation is approaching the threshold. The engine operation approaching the threshold may indicate that a transition from operation below the threshold to operation above the threshold is expected. As one example, the controller may input the compressor mass flow rate, compressor speed, and compressor pressure ratio into one or more look-up tables, algorithms, or maps (such as compressor map 1000 of FIG. 10) to determine a real-time estimation of a distance from the threshold (e.g., first threshold 1008). Additionally or alternatively, as another example, the controller may input the engine speed and load into one or more look-up tables, algorithms, or maps (such as engine map 800 of FIG. 8) to determine the real-time estimation of the distance from the threshold (e.g., threshold 805). It may be determined that the engine operation is approaching the threshold in response to the distance from the threshold being within a predetermined amount and/or the distance from the threshold decreasing at greater than a threshold rate, for example.

If the engine operation is not approaching the threshold, a transition across the threshold is not expected, and method 600 may return to 606 to continue maintaining the VID closed. If the engine operation is approaching the threshold, method 600 proceeds to 610 and includes increasing an amount of power delivered to an exhaust turbine of the turbocharger (e.g., turbine 176 of FIG. 1) to avoid a momentary reduction in compressor mass flow rate that may occur when the VID is adjusted to an open position. For example, during a transition from operating in the low load region 808b to the high load region 808a shown in FIG. 8 (or a transition from operating in the first compressor map region 1010 to one of the second compressor map region 1012, the third compressor map region 1013, and the fourth compressor map region 1014 of FIG. 10), if the turbine power is maintained during the transition, a momentary loss in compressor efficiency and therefore compressor mass flow rate is expected. Therefore, the controller may perform an anticipatory control action to maintain the compressor efficiency, and thus the mass flow rate, during the transition.

Specifically, if the turbine is a VGT, the turbine power may be determined based on a VGT vane position and the pre-turbine exhaust pressure. In order to avoid the loss in mass flow rate, which also reduces the surge margin, the controller may increase the power delivered to the exhaust turbine via a coordinated adjustment of the VGT vane position and an EGR valve position. For example, the controller may input the real-time estimation of the distance from the threshold, which serves as a transition boundary, into one or more look-up tables, algorithms, or maps and output the corresponding VGT vane position and/or EGR valve position. The controller may then send command signals to the VGT and/or the EGR valve to adjust the VGT vanes and/or the EGR valve to the output positions. As an example, decreasing an opening of the EGR valve may increase the pre-turbine exhaust pressure, thereby increasing the compressor speed and maintaining the compressor mass flow rate. As another example, adjusting the VGT vanes to a position that decreases a cross sectional opening of the turbine may increase the pre-turbine exhaust pressure.

At 612, method 600 includes determining if the engine operation crosses the threshold. For example, the engine operation may cross the threshold by going from an operating point below the threshold to an operating point above the threshold, such as by going from an operating point within low load region 808b to an operating point in high load region 808a shown in FIG. 8. As another example, the engine operation may cross the threshold by going from a compressor operating point in the first compressor map region 1010 to a compressor operating point in one of the second compressor map region 1012, the third compressor map region 1013, and the fourth compressor map region 1014 shown in FIG. 10.

If the engine operation does not cross the threshold, method 600 may return to 606 to maintain the VID closed. Furthermore, if the engine operation is no longer approaching the threshold, the controller may reduce the power delivered to the exhaust turbine, such as by reducing the exhaust pressure upstream of the exhaust turbine. For example, the controller may undo the anticipatory control action performed at 610 to revert the VGT vanes and/or the EGR valve to nominal positions for the given operating conditions. The controller may refer to a look-up table having the engine speed and load as the input and output the EGR valve position and/or the VGT vane position corresponding to the input engine speed-load, for example. In another example, the controller may determine the EGR amount (and thus the EGR valve position) and/or VGT vane position through logic rules that directly take into account parameters such as engine load, engine speed, engine temperature, etc.

If the engine operation crosses the threshold, method 600 proceeds to 614 and includes opening the VID. Opening the VID may include the controller sending an electronic signal to an actuator of the VID (such as actuator 223 shown in FIGS. 2A-2B) to adjust the VID from the closed position to the open position (e.g., as shown in FIGS. 2B and 3B). In the open position, flow restriction through the VID is minimized. Adjusting the VID from the closed position to the open position may include pivoting a plurality of adjacently arranged vanes of the VID, via the actuator coupled to an actuation plate (e.g., actuation plate 215 shown in FIGS. 2A-3B), in a direction relative to a central axis of the compressor (about which an impeller of the compressor rotates) so that the vanes are parallel to the direction of flow and an effective diameter of the outlet end of the VID is increased.

At 616, method 600 includes decreasing the power delivered to the exhaust turbine. For example, once the threshold has been crossed and the operating condition is established to be out of the low load region 808b and/or the first compressor map region 1010, the controller may revert the VGT vane position and/or the EGR valve position back to nominal positions for the given operating conditions. For example, the EGR valve may be further opened, and the VGT vanes may be adjusted to a position in which the cross sectional opening of the exhaust turbine is increased. In this way, the anticipatory control action at 610 may temporarily increase the power delivered to the exhaust turbine so that the compressor efficiency, and thus mass flow, is maintained while actuating the VID from the closed to the open position. Then, once the VID is in the open position, the power delivered to the exhaust turbine is decreased to provide the desired mass flow rate. Following 616, method 600 ends.

Returning to 604, if instead the engine is not operating below the threshold (e.g., the current engine speed and load point is in the high load region 808a shown in map 800 and to the right of the first threshold 1008 of compressor map 1000), method 600 continues to 618 and includes maintaining the VID open. Because the engine is already operating above the threshold, which corresponds to operation with the VID open, it is expected that the VID will already be in the open position.

At 620, method 600 includes determining if the engine operation crosses the threshold. For example, the engine operation may cross the threshold by going from an operating point above the threshold to an operating point below the threshold, such as by going from an operating point within the high load region 808a to an operating point in the low load region 808b shown in FIG. 8. As another example, the engine operation may cross the threshold by going from a compressor operating point outside of the first compressor map region 1010 to a compressor operating point inside of the first compressor map region 1010 shown in FIG. 10.

If the engine operation does not cross the threshold, method 600 may return to 618 to maintain the VID open. If the engine operation crosses the threshold, method 600 proceeds to 622 and includes closing the VID. Closing the VID may include the controller sending an electronic signal to the actuator of the VID to adjust the VID from the open position to the closed position. Adjusting the VID from the open position to the closed position may include pivoting each vane of the VID, via the actuator coupled to the actuation plate, so a plane of each vane is perpendicular to the direction of flow and the effective diameter of the outlet end of the VID is decreased. Unlike transitioning the VID from a closed to an open position, the controller may transition the VID from the open position to the closed position without an anticipatory control action, as closing the VID may not result in a decreased compressor efficiency and a decreased mass flow rate. With the VID in the closed position and an inlet of the impeller reduced, flow through the impeller is restricted while a surge margin of the compressor is extended, thereby increasing compressor efficiency and reducing fuel economy. Following 622, method 600 ends.

In this way, by varying an inlet diameter of a compressor via a VID based on engine operating conditions, a flow range of the compressor may be increased while compressor efficiency is increased. Furthermore, performing anticipatory control actions when transitioning the VID from a closed position, in which the inlet of the impeller is reduced, to an open position may ensure that the compressor efficiency and mass flow is maintained. Overall, engine fuel economy may be increased.

Figure 7:
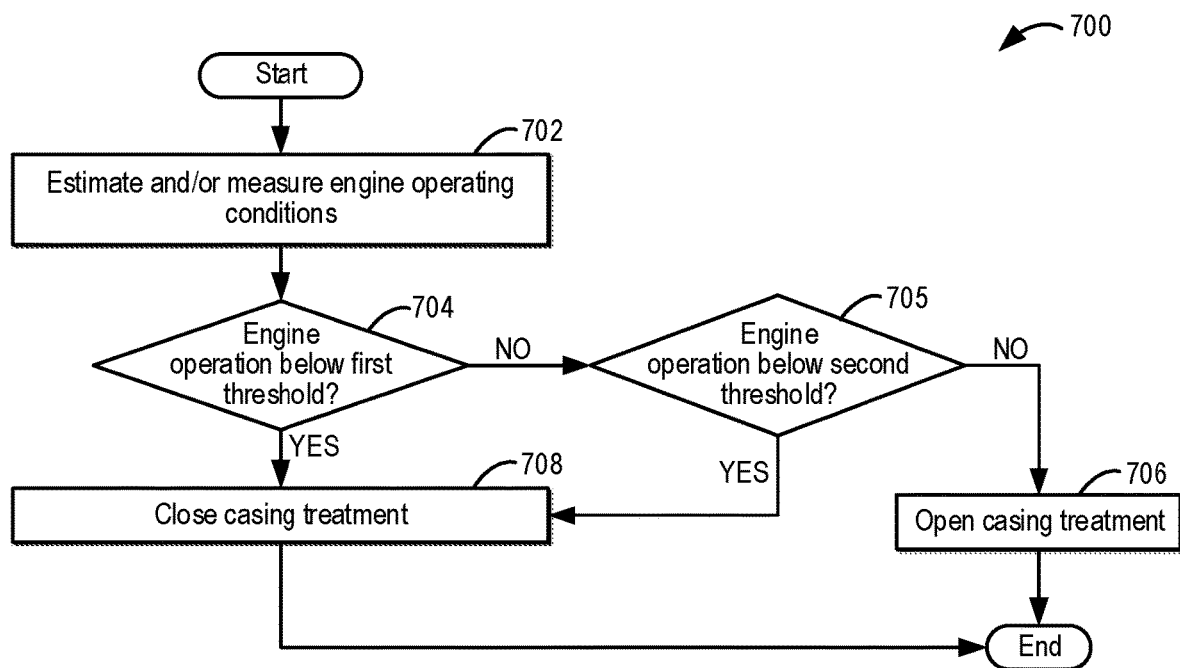
FIG. 7 shows a flow chart of an example method for controlling an opening of a port of a casing treatment.
Figure 8:
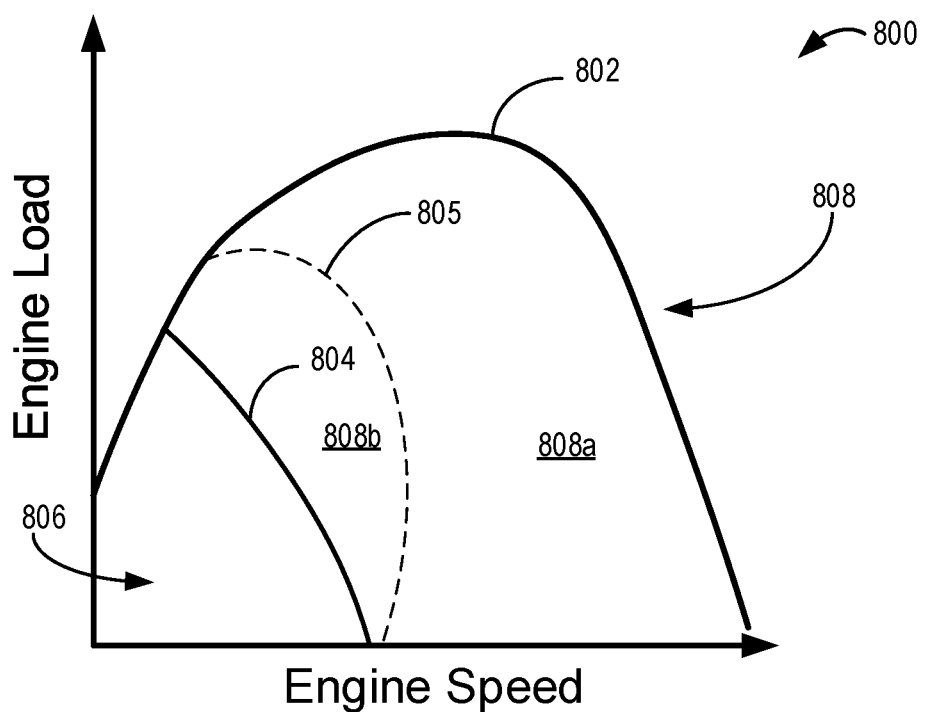
FIG. 8 shows an engine load and engine speed map for controlling a variable inlet device and an active casing treatment of a compressor.

Turning to FIG. 7, a flow chart of an example method 700 for controlling operation of an active casing treatment of a compressor is shown. The compressor may be included in an engine system, such as the system of engine 10 shown in FIG. 1. The active casing treatment (e.g., active casing treatment 212 shown in FIGS. 2A and 2B) may include a recirculation passage and a slidable valve (e.g., slidable valve 234a of FIGS. 2A and 2B). A controller (e.g., controller 12 of FIG. 1) may control flow through the recirculation passage by adjusting a position of the slidable valve via an actuator (e.g., actuator 209 of FIGS. 2A and 2B). As also shown in FIGS. 2A-2B, the compressor may additionally include a variable inlet device (e.g., VID 240) positioned in the compressor inlet. In particular, including the VID selectively restricts flow through the compressor by varying an inlet area of the compressor. However, including a VID alone may not adequately address surge at higher compressor speeds and/or pressure ratios, as the VID may be maintained open at higher compressor speed conditions to deliver a requested boost pressure. Opening the recirculation passage of the active casing treatment enables the surge margin to be extended at higher compressor speeds and/or pressure ratios by allowing air from the compressor outlet to vent and return to the inlet conduit. However, at lower compressor speeds and/or pressure ratios, particularly while the VID is used to restrict flow through the compressor, the compressor efficiency is reduced if the recirculation passage is kept open. Therefore, decreases in the compressor efficiency may be avoided by controlling flow through the recirculation passage based on operating conditions, such as by opening the recirculation passage and using the active casing treatment for surge mitigation during conditions in which the VID is not used (e.g., the VID is open) and closing the recirculation passage (and not using the active casing treatment for surge mitigation) during conditions in which the VID is used for surge mitigation (e.g., the VID is closed) and/or while the compressor is not approaching surge conditions.

At 702, method 700 includes estimating and/or measuring engine operating conditions. Engine operating conditions may include engine speed, engine load, engine temperature (such as inferred from an engine coolant temperature measured by an engine coolant temperature sensor), mass air flow (e.g., as measured by a MAF sensor, such as MAF sensor 122 of FIG. 1), intake manifold pressure (e.g., as measured by a MAP sensor, such as MAP sensor 124 of FIG. 1), a pressure ratio across a compressor, a mass air flow rate through the compressor, a speed of the compressor, a position of the slidable valve of the active casing treatment, a position of the VID, etc. The operating conditions may be measured or inferred based on available data.

At 704, it is determined whether the engine is operating below a first threshold. Operating below the first threshold may include a current (e.g., currently determined) engine speed and engine load being below the first threshold. In one example, the first threshold may be a pre-set threshold stored in a map, such as the threshold 805 in map 800 of FIG. 8, or a look-up table in a memory of the controller. When the engine is operating at an engine speed and engine load point that falls to the left of the threshold 805, the engine is in the low load region 808b where peak torque operation of the engine may not be demanded. Then engine operation falls to the right of the threshold 805, the engine is operating in the high load region 808a where peak torque operation and higher boost pressure may be requested.

In an alternative example, the first threshold may be a mass flow rate threshold. For example, the mass flow rate into the compressor may be compared to a threshold mass flow rate, such as the first threshold 1008 of compressor map 1000 of FIG. 10. When the mass flow rate is greater than the first threshold 1008, the compressor may be operating in one of the second compressor map region 1012, the third compressor map region 1013, and the fourth compressor map region 1014, corresponding to the high load region 808a of FIG. 8. When the mass flow rate is lower than the threshold, the compressor may be operating in the first compressor map region 1010, corresponding to the low load region 808b of FIG. 8. In some examples, the threshold mass flow rate may vary based on the compressor pressure ratio. A controller (e.g., controller 12 of FIG. 1) may input the pressure ratio into a look-up table or map and output the threshold mass flow rate, for example.

If the engine is not operating below the first threshold, method 700 continues to 705 and includes determining if engine operation is below a second threshold. The second threshold, which is different than the first threshold, may be a threshold compressor pressure ratio. The second threshold may correspond to the second threshold 1011 shown in FIG. 10, for example. In some examples, the threshold compressor pressure ratio may vary based on the compressor mass flow rate. Therefore, the controller may input the mass flow rate into a look-up table or map and output the second threshold, for example.

When engine operation is such that the compressor pressure ratio is above the second threshold, the compressor may be approaching surge conditions. Extending a surge margin of the compressor when the compressor is approaching surge conditions may increase an operating range of the compressor and decrease a likelihood of compressor surge. Therefore, if the engine is not operating below the second threshold, method 700 proceeds to 706 and includes opening (or maintaining open) the casing treatment. Opening the casing treatment may include the controller sending an electronic signal to actuate the slidable valve from a closed position (e.g., shown in FIG. 2A) to an open position (e.g., shown in FIG. 2B) or maintain the slidable valve in the open position. In the open position, recirculation flow is enabled from an intake passage of the compressor, through a bleed port proximate to an impeller of the compressor, to the recirculation passage of the active casing treatment, and back to the intake passage via a recirculation port. By recirculating air through the active casing treatment, a surge margin may be extended at high compressor speeds and/or high pressure ratios. Following 706, method 700 ends.

Returning to 705, if the engine is operating below the second threshold, method 700 proceeds to 708 and includes closing (or maintaining closed) the casing treatment. Closing the casing treatment may include the controller sending an electronic signal to actuate the slidable valve from the open position to the closed position or maintain the slidable valve in the closed position. In the closed position, recirculation flow is blocked by the slidable valve, which may be positioned to cover (e.g., block air flow at) the bleed port or the recirculation port. As such, a greater proportion of the air drawn into the compressor intake passage is directed through the impeller and downstream to an intake manifold of the engine. For example, if the engine is operating above the first threshold and below the second threshold, the engine operating conditions may be such that compressor the compressor is operating within one of the third compressor map region 1013 and the fourth compressor map region 1014 shown in FIG. 10, which are not approaching the surge limit 1004. In the fourth compressor map region 1014, the casing treatment may be closed to avoid a compressor efficiency penalty due to flow loss inside of the casing treatment. Similarly, the third compressor map region 1013 is not near the surge limit, and therefore, surge mitigation is not needed. Following 708, method 700 ends.

It should be noted that in some examples, the casing treatment may be opened while operating in the third compressor map region 1013 in order to extend the choke flow limit 1006 shown in FIG. 10. Whether or not the casing treatment is opened while the compressor is operating in the third compressor map region 1013 depends on a wheel design of the compressor. Therefore, variants of method 700 may be used to maximize the compressor map width for a specific wheel design.

Returning to 704, if the engine is operating below the first threshold, method 700 proceeds to 708 and includes closing (or maintaining closed) the casing treatment, as described above. By preventing air recirculation through the active casing treatment at low compressor speeds when the compressor also includes a VID in a closed position that restricts airflow through the compressor, overcompensation for surge mitigation is avoided, and compressor efficiency is increased. Following 708, method 700 ends.

In this way, by controlling air recirculation through an active casing treatment based on compressor operating conditions, a surge margin of the compressor having a VID may be extended at high compressor speeds and engine loads (such as by opening the active casing treatment and enabling the recirculation) while compressor efficiency is increased at low compressor speeds and engine loads (such as by closing the active casing treatment and blocking the recirculation while the VID is closed to mitigate surge or while surge mitigation is not needed). Overall, an air flow range of the compressor may be increased by enabling air recirculation through the active casing treatment at higher compressor speeds and engine loads, and engine fuel economy may be increased by preventing air recirculation through the active casing treatment at lower compressor speeds and engine loads.

Figure 9:
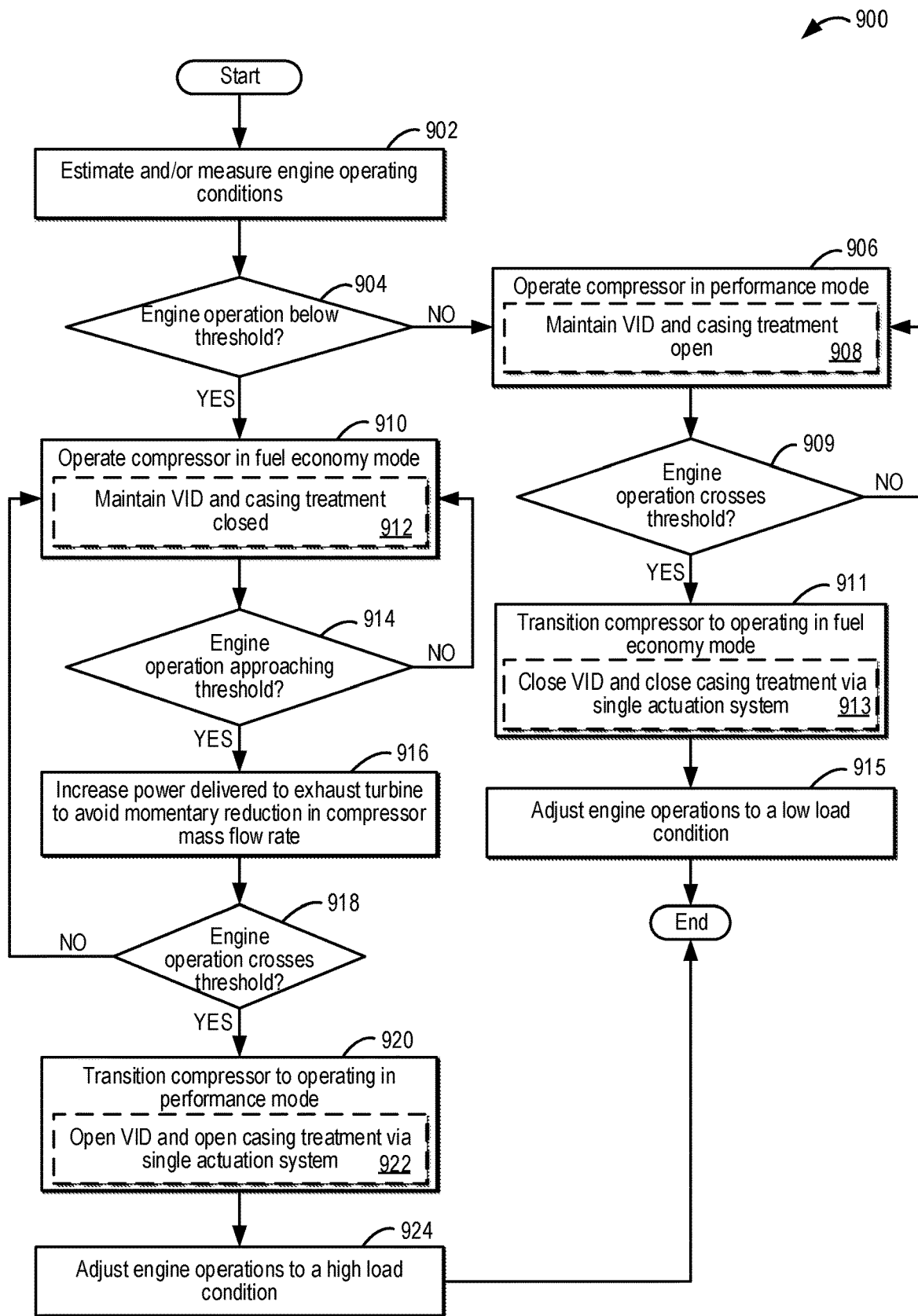
FIG. 9 shows a flow chart of an example method for coordinating control of a variable inlet device and an active casing treatment of a compressor, such as via a common actuator.

Next, FIG. 9 shows an example method 900 for coordinating control of a position of a variable inlet device positioned in an inlet conduit of a compressor and control of an active casing treatment of the compressor. Specifically, the variable inlet device (VID) may be VID 440 shown in FIGS. 4A-5C. The VID may be positioned in an inlet conduit of a compressor having an active casing treatment, upstream of an impeller. Furthermore, the active casing treatment and the VID may be simultaneously controlled by a single actuation system, such as actuation system 435 shown in FIGS. 4A-5C. For example, a controller (e.g., controller 12 shown in FIG. 1) may send a signal to the actuation system to move the VID between a smaller radius (e.g., closed) position and a larger radius (e.g., open) position while simultaneously transitioning a recirculation passage of the active casing treatment between a closed position and an open position, as further described below.

Method 900 begins at 902 and includes estimating and/or measuring engine operating conditions. Engine operating conditions may include engine speed, engine load, engine temperature (such as inferred from an engine coolant temperature measured by an engine coolant temperature sensor), mass air flow (e.g., as measured by a MAF sensor, such as MAF sensor 122 of FIG. 1), intake manifold pressure (e.g., as measured by a MAP sensor, such as MAP sensor 124 of FIG. 1), a pressure ratio across a compressor, a mass air flow rate through the compressor, a speed of the compressor, a position of a unison ring of the actuation system (e.g., unison ring 415 of FIGS. 4A-5C), etc. The operating conditions may be measured or inferred based on available data.

At 904, it is determined whether the engine is operating below an engine load threshold. The engine load threshold may delineate engine operations with relatively high load and high flow from operations with relatively low load and low flow. For example, the controller may input the current engine speed and/or load, including the mass flow rate, into a map or look-up table to determine where engine operations are relative to the threshold 805, represented by the dashed line, in the engine map 800 of FIG. 8. The engine map 800 may be stored in a memory of the controller, and the threshold 805 may define engine speeds and loads at which adjustment of the VID and active casing treatment positions may be desired to either prioritize engine performance or fuel efficiency.

In the second area 808 of engine map 800, the threshold 805 divides the second area 808 into a high load region 808*a* and a low load region 808*b*. The high load region 808*a* is to the right of the threshold 805 and comprises engine loads and speeds higher than those defined by the threshold 805. Peak torque engine operation is included in high load region 808*a*, and the VID and the active casing treatment may be adjusted to provide increased flow through the compressor to enable the peak torque engine operation as well as surge mitigation. In the low load region 808*b*, engine loads and speeds are lower than those defined by the threshold 805 and may correspond to idling or cruising operations of the vehicle. Thus, in this region, a capacity for peak torque engine operation is not needed, and the VID and the active casing treatment may be adjusted into positions to decrease mass flow into the compressor while increasing compressor efficiency and therefore engine fuel economy.

While operating in the low load region 808*b*, compressor efficiency (and thus fuel efficiency) may be increased by narrowing an inlet of the compressor using the VID and by preventing recirculation through a casing treatment. While operating in the high load region 808*a*, engine power may be increased by widening the inlet of the compressor via the VID, allowing more airflow through the compressor, and by extending the surge margin at higher speeds by enabling recirculation through the casing treatment. Thus, compressor efficiency and fuel economy may be prioritized while operating in the low load region 808*b* while engine performance may be prioritized while operating in the high load region 808*a*.

In another example, the controller may additionally or alternatively compare a measured compressor pressure ratio and mass flow into the compressor with a compressor map, such as the compressor map 1100 of FIG. 11. Compressor map 1100 includes a pressure ratio and mass flow threshold 1108, represented as a dot-dashed line, that may be analogous to the engine load threshold 805 of the engine map 800 of FIG. 8. The pressure ratio and mass flow threshold 1108 defines a boundary between a first compressor map region 1110 and a second compressor map region 1112. At compressor operating points (e.g., mass flow rates and pressure ratios) below the pressure ratio and mass flow threshold 1108, the compressor is operating in the first compressor map region 1110, which corresponds to low compressor pressure ratios and mass flow rates (and lower compressor speeds) and also to the low load region 808*b* of engine map 800. At compressor operating points at or above the pressure ratio and mass flow threshold 1108, the compressor is operating in the second compressor map region 1112, which corresponds to mid-to-high compressor pressure ratios and mass flow rates (and higher compressor speeds) and also to the high load region 808*a* of engine map 800.

Returning to 904 of FIG. 9, if the engine is not operating below the engine load threshold, engine operation is, for example, in the high load region 808*a* of engine map 800, and the method continues to 906 to operate the compressor in a performance mode. While operating in the performance mode, engine power is prioritized, such as by increasing airflow through the compressor. While operating in the engine performance mode, the VID and the casing treatment are maintained open, as indicated at 908. For example, the VID may be held in the larger radius position by the unison ring, wherein the vanes of the VID are retracted into a wall of the compressor intake passage, as shown in FIGS. 4B and 5C. Furthermore, maintain the position of the unison ring maintains the casing treatment open, such as by maintaining valves coupled to the unison ring rotated out of the recirculation passage. With the engine already operating above the threshold, it is expected that the VID and the casing treatment will already be in the open position.

At 909, method 900 includes determining if the engine operation crosses the threshold. For example, the controller may monitor the engine operating conditions over time in order to adjust compressor operation in response to the engine load falling below the engine load threshold. The engine operation may cross the threshold by going from an operating point above the threshold to an operating point below the threshold, such as by going from an operating point within the high load region 808*a* to an operating point in the low load region 808*b* shown in FIG. 8. As another example, the engine operation may cross the threshold by going from a compressor operating point within the second compressor map region 1112 to a compressor operating point inside of the first compressor map region 1110 shown in FIG. 11.

If the engine operation does not cross the threshold, method 900 may return to 906 to continue operating the compressor in the performance mode, with the VID open (e.g., in the large trim position) and the casing treatment open to enable high compressor mass flows (via the open VID) with surge mitigation (via the open casing treatment) for increased engine power. If the engine operation crosses the threshold, method 900 proceeds to 911 and includes transitioning the compressor to operating in a fuel economy mode. While operating in the fuel economy mode, engine fuel economy is prioritized over engine power, such as by increasing compressor efficiency while the compressor operates at low mass flow area. Transitioning the compressor to operating in the fuel economy mode includes closing the VID and closing the casing treatment via the single actuation system, as indicated at 913. For example, closing the VID includes actuating the VID to the smaller radius position, such as by rotating the unison ring to a first, closed position that places vanes of the VID within an intake passage of the compressor. As explained above with reference to FIGS. 4A and 5A, in the smaller radius position, an inlet diameter/open area of the impeller is reduced, thereby increasing compressor efficiency at low mass flows. In an alternative example, when the VID comprises pivotable vanes, closing the VID may include pivoting each vane of the VID via an actuator coupled to an actuation plate of the vanes so that a plane of each vane is perpendicular to the direction of air flow through the compressor, thereby narrowing the impeller inlet.

Due to the single, shared actuation system, actuating the VID to the smaller radius position simultaneously actuates the active casing treatment to the closed position such that airflow through a recirculation passage of the active casing treatment (e.g., recirculation passage 418 of FIGS. 4A-4B) is blocked by a valve (e.g., valve 434 of FIG. 4A and FIGS. 5A-5C). By blocking flow recirculation at lower mass flows and pressure ratios, compressor efficiency is increased, thereby increasing vehicle fuel economy. For example, closing the VID while maintaining the active casing treatment open would result in a compressor efficiency penalty. By closing the active casing treatment while the VID is in the closed position, the compressor efficiency penalty is avoided. Thus, a single signal from the controller results in the actuation of both the VID and the valve, which may move in concert.

Other examples may include independent actuation mechanisms for each of the VID and active casing treatment. In such configurations, the VID and active casing treatments may be adjusted simultaneously or at offset timings. Furthermore, the closing of the VID and active casing treatment may occur directly and rapidly from the open position, if previously open, or may close gradually and continuously and pause at any point between the fully open and fully closed positions.

At 915, method 900 includes adjusting engine operations to a low load condition. Engine operations that may be varied include increasing an opening of a throttle valve to maintain a flow of boosted air to the engine intake. Ignition timing may be adjusted, such as by adjusting fuel injection timing or adjusting spark timing in response to the decreased boost pressure delivered to combustion chambers of the engine, and fuel amount may also be adjusted accordingly. However, the actuation of the VID to the smaller radius condition and the casing treatment to the closed position in response to the engine operating below the engine load threshold may be calibrated such that there is minimal change in the compressor mass flow rate, the pressure ratio across the compressor, and the compressor efficiency. In this way, the engine load may smoothly transition between a high load condition and the low load condition. Following 915, method 900 ends.

Returning to 904, if the engine is operating below the engine load threshold, e.g., in the low load region 808*b* of engine map 800, method 900 proceeds to 910 and includes operating the compressor in a fuel economy mode. While operating in the fuel economy mode, engine fuel economy is prioritized over engine power, such as by performing surge mitigation with the VID and not with the casing treatment in order to increase compressor efficiency. Operating the compressor in the fuel economy mode may include maintaining the VID and the casing treatment closed, as indicated at 912. For example, the VID may be held in the smaller radius position by the unison ring, wherein the vanes of the VID are positioned within the intake passage of the compressor, as shown in FIGS. 4A and 5A. Furthermore, maintaining the position of the unison ring maintains the casing treatment closed, such as by maintaining valves coupled to the unison ring rotated into the recirculation passage. Because the engine is already operating below the threshold, which corresponds to operation with the VID and the casing treatment both closed, it is expected that the VID and the casing treatment will already be in the closed position. Thus, if the VID and the casing treatment are already closed (e.g., the VID is in the smaller radius position and the valve is blocking flow through the active casing treatment), the VID and the casing treatment positions may remain unchanged. With the VID maintained in the smaller radius, closed position, the compressor is operated in a small trim mode that that reduces an inlet diameter/open area of the impeller to increase compressor efficiency at a low flow rate (compared to when the VID is open). At the same time, maintaining the casing treatment in the closed position blocks air recirculation through the casing treatment, thereby avoiding flow loss through the casing treatment to increase compressor efficiency and thereby increase engine fuel economy (compared to when the VID is closed and the casing treatment is open).

At 914, the method includes determining if the engine operation is approaching the threshold. The engine operation approaching the threshold may indicate that a transition from operation below the threshold to operation above the threshold is expected. As one example, the controller may input the compressor mass flow rate, compressor speed, and compressor pressure ratio into one or more look-up tables, algorithms, or maps (such as compressor map 1100 of FIG. 11) to determine a real-time estimation of a distance from the threshold (e.g., threshold 1108). Additionally or alternatively, as another example, the controller may input the engine speed and load into one or more look-up tables, algorithms, or maps (such as engine map 800 of FIG. 8) to determine the real-time estimation of the distance from the threshold (e.g., threshold 805). It may be determined that the engine operation is approaching the threshold in response to the distance from the threshold being within a predetermined amount and/or the distance from the threshold decreasing at a greater than threshold rate, for example.

If the engine operation is not approaching the threshold, a transition across the threshold is not expected, and method 900 may return to 910 to continue operating the compressor in the fuel economy mode, wherein the VID and the casing treatment are maintained closed. If the engine operation is approaching the threshold, an opening of the VID and casing treatment is anticipated. Method 900 proceeds to 916 and includes increasing an amount of power delivered to an exhaust turbine of the turbocharger (e.g., turbine 176 of FIG. 1) to avoid a momentary reduction in compressor mass flow rate. For example, during a transition from operating in the low load region 808b to the high load region 808a shown in FIG. 8 (or a transition from operating in the first compressor map region 1110 to the second compressor map region 1112 of FIG. 11), if the turbine power is maintained during the transition, a momentary loss in compressor efficiency and therefore compressor mass flow rate is expected when the VID and the casing treatment are opened. Therefore, the controller may perform an anticipatory control action to maintain the compressor efficiency, and thus the mass flow rate, during the transition.

Specifically, if the turbine is a VGT, the turbine power may be determined based on a VGT vane position and a pre-turbine exhaust pressure (e.g., as measured by pressure sensor 158 shown in FIG. 1). In order to avoid the loss in mass flow rate, which also reduces the surge margin, the controller may increase the power delivered to the exhaust turbine via a coordinated adjustment of the VGT vane position and an EGR valve position. For example, the controller may input the real-time estimation of the distance from the threshold, which serves as a transition boundary, into one or more look-up tables, algorithms, or maps and output the corresponding VGT vane position and/or EGR valve position. The controller may then send command signals to the VGT and/or the EGR valve to adjust the VGT vanes and/or the EGR valve to the output positions. As an example, decreasing an opening of the EGR valve may increase the pre-turbine exhaust pressure.

At 918, method 900 includes determining if the engine operation crosses the threshold. For example, the engine operation may cross the threshold by going from an operating point below the threshold to an operating point above the threshold, such as by going from an operating point within low load region 808b to an operating point in high load region 808a shown in FIG. 8. As another example, the engine operation may cross the threshold by going from a compressor operating point in the first compressor map region 1110 to a compressor operating point in the second compressor map region 1112 shown in FIG. 11.

If the engine operation does not cross the threshold, method 900 may return to 910 to continue operating the compressor in the fuel economy mode, wherein the VID and the casing treatment are maintained closed. Furthermore, if the engine operation is no longer approaching the threshold, the controller may reduce the power delivered to the exhaust turbine, such as by reducing the exhaust pressure upstream of the exhaust turbine. For example, the controller may undo the anticipatory control action performed at 916 to revert the VGT vanes and/or the EGR valve to nominal positions for the given operating conditions. The controller may refer to a look-up table having the engine speed and load as the input and output the EGR valve position and/or VGT vane position corresponding to the input engine speed-load, for example. In another example, the controller may determine the EGR amount (and thus the EGR valve position) and/or the VGT vane position through logic rules that directly take into account parameters such as engine load, engine speed, engine temperature, etc.

If the engine operation crosses the threshold, method 900 proceeds to 920 and includes transitioning the compressor to operating in the performance mode. Transitioning the compressor to operating in the performance mode includes opening the VID and opening the casing treatment via the single actuation system, as indicated at 922. For example, opening the VID includes actuating the VID to the larger radius position, such as by rotating the unison ring to a second, open position that retracts the vanes of the VID into a wall of the compressor intake passage, as shown in FIGS. 4B and 5C. In an alternative example, when the VID comprises pivotable vanes, opening the VID may include pivoting a plurality of adjacently arranged vanes of the VID via the actuator coupled to the actuation plate of the vanes so that the plane of the vanes is parallel to the direction of air flow through the compressor. In the open, larger radius position, the VID does not restrict flow through the impeller, and the compressor inlet is larger, enabling high compressor flows and pressure ratios at high efficiencies.

Due to the single, shared actuation system, actuating the VID to the larger radius position simultaneously transitions the active casing treatment to the open position by rotating the valve out of the recirculation passage. Without the valve positioned in the recirculation passage, airflow through the recirculation passage is enabled, thereby extending the surge margin of the compressor. Thus, a single signal from the controller results in the actuation of both the VID and the valve, which may move in concert.

Other examples may include independent actuation mechanisms for each of the VID and active casing treatment. In such configurations, the VID and active casing treatments may be adjusted simultaneously or at offset timings. Furthermore, the opening of the VID and the active casing treatment may occur directly and rapidly from the closed position, if previously closed, or may open gradually and continuously and pause at any point between the fully closed and fully open positions.

At 924, engine operations are adjusted to a high load condition. Engine operations that may be varied include decreasing an opening of a throttle valve to maintain a flow of boosted air to the engine intake. Ignition timing may be adjusted, such as by adjusting fuel injection timing or adjusting spark timing in response to the increased boost pressure delivered to combustion chambers of the engine, and fuel amount may also be adjusted accordingly. However, the actuation of the VID to the larger radius condition and the casing treatment to the open position after the anticipatory control action has been performed at 916 and in response to the engine operating above the engine threshold may be calibrated such that there is minimal change in the compressor mass flow rate, the pressure ratio across the compressor, and the compressor efficiency. In this way, the engine load may smoothly transition between the low load condition and the high load condition.

Adjusting engine operations to the high load conditions may further include decreasing the power delivered to the exhaust turbine. For example, once the threshold has been crossed and the operating condition is established to be out of the low load region 808b and/or the first compressor map region 1110, the controller may revert the VGT vane position and/or the EGR valve position back to nominal positions for the given operating conditions. In this way, the anticipatory control action at 916 may temporarily increase the power delivered to the exhaust turbine so that the compressor efficiency, and thus mass flow, is maintained during actuating the VID from the closed to the open position and the casing treatment from the closed position to the open position. Then, once the VID and the casing treatment are in the open position (e.g., the unison ring is in the second, open position), the power delivered to the exhaust turbine is decreased to provide the desired mass flow rate for the given engine load. Following 924, method 900 ends.

In this way, by using a VID and an active casing treatment that are simultaneously actuated via a single actuation system, a turbocharger compressor may be operated in one of two operating modes: a fuel economy mode, wherein the VID and the active casing treatment are closed, and a performance mode, wherein the VID and the active casing treatment are open. The compressor may be transitioned between the two operating modes multiple times throughout a vehicle drive cycle, with the current mode selected based on current operating conditions, to increase an overall airflow range of the compressor. The selected operating mode may increase an efficiency of the compressor at the current operating conditions, resulting in a faster turbocharger response during transient engine conditions. Furthermore, the increased compressor efficiency results in lower fuel consumption for both steady state and transient engine operation.

FIG. 12 shows an example timeline 1200 of operating an engine with a compressor having a VID and an active casing treatment that may be independently actuated, such as compressor 202 shown in FIGS. 2A-2B. The compressor may be included in a turbocharger of a vehicle, such as shown in FIG. 1, that also includes a high pressure EGR system. The VID may be adjusted between an open and a closed position based on engine operating conditions, such as according to the method of FIG. 6. Similarly, the active casing treatment (CT) may be adjusted between an open and a closed position based on engine operating conditions, such as according to the method of FIG. 7. Engine load is shown in plot 1202, compressor mass flow rate is shown in plot 1204, compressor pressure ratio is shown in plot 1205, VID position is shown in plot 1206, CT position is shown in plot 1208, and an EGR valve position is shown in plot 1210. For all of the above, the horizontal axis represents time, with time increasing along the horizontal axis from left to right. The vertical axis represents each labeled parameter. For plots 1202 and 1204, a value of the labeled parameter increases up the vertical axis from bottom to top. For plots 1206 and 1208, the vertical axis represents whether the VID and the CT are open or closed, respectively, as labeled. For plot 1210, the vertical axis shows the EGR valve position from a fully closed position ("closed") to a fully open position ("open"). Furthermore, a surge limit is shown by dashed line 1201, which may be similar to the surge threshold 804 of FIG. 8, a threshold engine load is shown by dashed line 1203, which may be similar to the engine load threshold 805 of FIG. 8, and a threshold compressor pressure ratio is shown by dashed line 1207, which may be similar to second threshold 1011 of FIG. 10. When engine operation includes loads higher than the threshold engine load 1203, the engine may be operating in a high load region such as the high load region 808a of FIG. 8. When engine operation includes loads lower than the threshold engine load 1203, the engine may be operating in a low load region such as the low load region 808b of FIG. 8. When the compressor operation includes pressure ratios above the threshold compressor pressure ratio 1207, the compressor may be approaching surge conditions. While the threshold compressor pressure ratio 1207 is shown having a single value in the example of FIG. 12, note that in other examples, the threshold compressor pressure ratio may vary based on the compressor mass flow, such as illustrated in FIG. 10.

Prior to time t1, the engine load (plot 1202) may be much higher than the surge threshold 1201 and also higher than the threshold engine load 1203, and the compressor mass flow rate (plot 1204) is relatively high. With the engine load greater than the threshold engine load, airflow restriction through the compressor is not indicated for surge mitigation. The airflow may include a mixture of fresh intake air and recirculated exhaust gas, for example. As such, the compressor is operated with the VID in the open position (plot 1206). Furthermore, the compressor pressure ratio (plot 1205) is greater than the threshold compressor pressure ratio 1207. Therefore, high pressure ratio and/or mass flow surge may be mitigated by the active casing treatment, which is in the open position (plot 1208). With the active casing treatment in the open position, airflow is enabled through a recirculation passage of the CT. The open position of the active casing treatment extends the surge margin, enabling higher mass flow rates and pressure ratios of the compressor.

With higher mass flow rates and pressure ratios enabled, engine power may be increased. Additionally, due to the high engine load (plot 1202), the EGR valve is open to a relatively small degree (plot 1210) to provide a relatively small amount of EGR to the engine.

At time t1, the compressor pressure ratio (plot 1205) decreases below the threshold compressor pressure ratio 1207. As a result, airflow through the recirculation passage is no longer desired for surge mitigation, and so the CT is actuated to the closed position. For example, a slidable valve (e.g., slidable valve 234a or slidable valve 234b shown in FIGS. 2A and 2B) is moved to the closed position via an actuator (e.g., actuator 209 shown in FIGS. 2A and 2B), thereby blocking airflow through the recirculation passage. By closing the CT when the compressor is not approaching a surge limit, compressor efficiency is increased.

Between time t1 and time t2, the engine load (plot 1202) decreases, such as due to a tip-out of an accelerator pedal by a vehicle operator. As the engine load decreases, the degree of opening of the EGR valve increases (plot 1210) in order to increase an amount of EGR provided to the engine. At time t2, the engine load (plot 1202) decreases below the threshold engine load (dashed line 1203). In response, the VID is actuated to the closed position (plot 1206), thereby reducing an effective size of an impeller of the compressor, and the CT is maintained in the closed position (plot 1208). With the VID in the closed position, the compressor is operated in a small trim mode, and airflow through the recirculation passage is blocked by the closed CT to increase compressor efficiency. The increased compressor efficiency also increases vehicle fuel economy.

Shortly before time t3, the engine load (plot 1202) increases, such as due to a tip-in of the accelerator pedal by the vehicle operator. With the engine load (plot 1202) approaching the threshold engine load 1203, the controller adjusts the EGR valve position in anticipation of the engine operation transitioning across the threshold engine load 1203. Specifically, the controller decreases the opening of the EGR valve (plot 1210) in order to increase an exhaust backpressure and therefore an amount of power delivered to an exhaust turbine of the turbocharger.

At time t3, the engine load (plot 1202) increases above the threshold engine load 1203. In response, the VID is actuated to the open position (plot 1206), thereby enabling higher mass flow rates through the impeller. The compressor mass flow rate (plot 1204) transitions smoothly due to the anticipatory control action of decreasing the EGR valve opening. After the engine load (plot 1202) increases above the threshold engine load 1203 and the VID is actuated to the open position (plot 1206), the EGR valve position is adjusted to a nominal position for the given operating conditions (e.g., engine speed and load). Specifically, the degree of opening of the EGR valve is increased (plot 1210) and is thereafter adjusted based on the engine operating conditions to provide a desired engine dilution. Because the compressor pressure ratio (plot 1205) remains below the threshold compressor pressure ratio 1207, the CT remains in the closed position (1208), thereby blocking airflow through the recirculation passage to increase the compressor efficiency.

Next, FIG. 13 shows an example timeline 1300 of operating an engine with a compressor having a VID and an active casing treatment that may be adjusted via a single actuation system, such as compressor 402 shown in FIGS. 4A-4B. The compressor may be included in a turbocharger of a vehicle, such as shown in FIG. 1, that further includes a high pressure EGR system. The VID and the active casing treatment (CT) may be simultaneously adjusted between an open and a closed position based on engine operating conditions, such as according to the method of FIG. 9. Engine load is shown in plot 1302, compressor mass flow rate is shown in plot 1304, VID position is shown in plot 1306, CT position is shown in plot 1308, and an EGR valve position is shown in plot 1310. For all of the above, the horizontal axis represents time, with time increasing along the horizontal axis from left to right. The vertical axis represents each labeled parameter. For plots 1302 and 1304, a value of the labeled parameter increases up the vertical axis from bottom to top. For plots 1306 and 1308, the vertical axis represents whether the VID and the CT are open or closed, respectively, as labeled. For plot 1310, the vertical axis shows the EGR valve position from a fully closed position ("closed") to a fully open position ("open"). Furthermore, a surge limit is shown by dashed line 1301, which may be similar to the surge threshold 804 of FIG. 8, and a threshold engine load is shown by dashed line 1303, which may be similar to the engine load threshold 805 of FIG. 8. When engine operation includes loads higher than the threshold engine load 1303, the engine may be operating in a high load region such as the high load region 808a of FIG. 8. When engine operation includes loads lower than the threshold engine load 1303, the engine may be operating in a low load region such as the low load region 808b of FIG. 8.

Prior to time t1, the engine load (plot 1302) may be much higher than the surge threshold 1301 and also higher than the threshold engine load 1303, and the compressor mass flow rate (plot 1304) is relatively high. With the engine load greater than the threshold engine load, airflow restriction through the compressor is not indicated for surge mitigation. The airflow may include a mixture of fresh intake air and recirculated exhaust gas, for example. As such, the compressor is operated with the VID in the open position (plot 1306). High pressure ratio and/or mass flow surge may be mitigated by the active casing treatment, which is in the open position (plot 1308). With the active casing treatment in the open position, airflow is enabled through a recirculation passage of the CT. The open position of the active casing treatment extends the surge margin, enabling higher mass flow rates and pressure ratios of the compressor. With higher mass flow rates and pressure ratios enabled, engine power may be increased. Therefore, prior to time t1, the compressor is operated in a performance mode.

Shortly before time t1, the engine load (plot 1302) decreases, such as due to a tip-out of an accelerator pedal by a vehicle operator. At time t1, the engine load (plot 1302) decreases below the threshold engine load (dashed line 1303). In response, the VID and the CT are simultaneously actuated to their closed positions (plots 1306 and 1308, respectively), thereby reducing an effective size of an impeller of the compressor (e.g., operating the compressor in a small trim mode) and preventing airflow through the recirculation passage to increase compressor efficiency. The increased compressor efficiency also increases vehicle fuel economy. Therefore, between time t1 and t2, the compressor is operated in a fuel economy mode.

Shortly before time t2, the engine load (plot 1302) increases, such as due to a tip-in of the accelerator pedal by the vehicle operator. With the engine load (plot 1302) approaching the threshold engine load 1303, the controller adjusts the EGR valve position in anticipation of the engine operation transitioning across the threshold engine load 1303. Specifically, the controller decreases the opening of the EGR valve (plot 1310) in order to increase an exhaust backpressure and therefore an amount of power delivered to an exhaust turbine of the turbocharger.

At time t2, the engine load (plot 1302) increases above the threshold engine load (1303). In response, the VID are the CT are simultaneously actuated to their respective open positions (plots 1306 and 1308, respectively), thereby enabling higher mass flow rates through the impeller and airflow through the recirculation passage. The compressor mass flow rate (plot 1304) transitions smoothly due to the anticipatory control action of decreasing the EGR valve opening. After the engine load (plot 1302) increases above the threshold engine load 1303 and the VID is actuated to the open position (plot 1306), the EGR valve position is adjusted to a nominal position for the given operating conditions (e.g., engine speed and load). Specifically, the degree of opening of the EGR valve is increased (plot 1310) and is thereafter adjusted based on the engine operating conditions to provide a desired engine dilution. With the VID in the open position and the CT in the open position, the compressor is again operated in the performance mode after time t2.

In this way, by effectively controlling an inlet area of a compressor impeller based on operating conditions using a variable inlet device positioned proximate to a leading edge of the impeller, a flow range of the compressor may be extended, such as by extending a surge margin at lower compressor mass flow rates. By further including an active casing treatment that selectively enables gas flow through a recirculation passage, the flow range of the compressor may be further extended, such as by extending the surge margin at higher compressor mass flow rates. Furthermore, by blocking gas flow through the recirculation passage while the variable inlet device is restricting flow through the impeller, compressor efficiency may be increased, thereby increasing vehicle fuel economy. By independently actuating the variable inlet device and the active casing treatment, the compressor efficiency may be further increased by maintaining the active casing treatment closed until the compressor approaches surge conditions. By actuating the variable inlet device and the active casing treatment through a common actuator, airflow through the compressor may be adjusted with fewer components and a simplified control method. Overall, whether individually actuated or actuated by a common actuator, by including both the variable inlet device and the active casing treatment and adjusting their positions based on compressor operating conditions, high engine power is available at higher engine loads without sacrificing vehicle fuel economy at lower engine loads.

The technical effect of positioning a variable inlet device to partially block flow to an impeller of a compressor is that an effective size of the impeller is reduced.

The technical effect of closing a recirculation passage of a casing treatment of a compressor while a variable inlet device restricts flow through the compressor is that compressor efficiency is increased, thereby increasing engine fuel economy.

In one example, a method comprises: adjusting an effective area of an impeller positioned in an inlet passage of a compressor while also adjusting gas flow through a casing treatment surrounding the inlet passage, the effective area and the gas flow both adjusted via a common, single actuator based on operating conditions. In the preceding example, additionally or optionally, adjusting the effective area of the impeller comprises adjusting an open area of a variable inlet device positioned in the inlet passage immediately upstream from a leading edge of the impeller while simultaneously adjusting a position of a valve within a recirculation passage of the casing treatment to adjust the gas flow through the casing treatment, the recirculation passage fluidically coupled to the inlet passage downstream of the leading edge of the impeller and upstream of the variable inlet device. In any or all of the preceding examples, additionally or optionally, adjusting the effective area of the impeller and adjusting gas flow through the casing treatment via the single actuator based on operating conditions comprises: adjusting the variable inlet device to a smaller, first open area to reduce the effective area while adjusting the valve to a closed position to block gas flow through the recirculation passage in response to engine load decreasing below a threshold engine load; and adjusting the variable inlet device to a larger, second open area to increase the effective area while adjusting the valve to an open position to enable gas flow through the recirculation passage in response to the engine load reaching or exceeding the threshold engine load. In any or all of the preceding examples, the method additionally or optionally further comprises, responsive to adjusting the variable inlet device from the first open area to the second open area, adjusting a position of a throttle valve positioned downstream of the compressor. In any or all of the preceding examples, the method additionally or optionally further comprises, responsive to adjusting the variable inlet device from the first open area to the second open area, adjusting ignition timing of an engine coupled downstream from the compressor. In any or all of the preceding examples, additionally or optionally, adjusting the effective area of the impeller while also adjusting the gas flow through the casing treatment via the single actuator comprises activating a motor to rotate a unison ring coupled to the valve and to a plurality of vanes of the variable inlet device. In any or all of the preceding examples, additionally or optionally, adjusting the variable inlet device to the first open area while adjusting the valve to the closed position comprises activating the motor to rotate the unison ring in a first direction, thereby moving the valve into the recirculation passage to block the gas flow through the recirculation passage and moving the plurality of vanes to protrude in the inlet passage and block gas flow at the leading edge of the impeller; and adjusting the variable inlet device to the second open area while adjusting the valve to the open position comprises activating the motor to rotate the unison ring in a second direction, thereby moving the valve out of the recirculation passage such that airflow through the recirculation passages is enabled and retracting the plurality of vanes from the inlet passage to within walls of the casing treatment to enable gas flow at the leading edge of the impeller. In any or all of the preceding examples, additionally or optionally, the compressor is driven by an exhaust turbine and the method further comprises: prior to adjusting the variable inlet device to the larger, second open area while adjusting the valve to the open position, increasing an exhaust pressure upstream of the exhaust turbine; and after adjusting the variable inlet device to the larger, second open area while adjusting the valve to the open position, decreasing the exhaust pressure upstream of the exhaust turbine. In any or all of the preceding examples, additionally or optionally, an exhaust gas recirculation passage is coupled upstream of the exhaust turbine and downstream of the compressor, increasing the exhaust pressure upstream of the exhaust turbine includes decreasing an opening of a valve disposed in the exhaust gas recirculation passage, and decreasing the exhaust pressure upstream of the exhaust turbine includes increasing an opening of the valve. In any or all of the preceding examples, additionally or optionally, the exhaust turbine includes variable vanes, increasing the exhaust pressure upstream of the exhaust turbine includes adjusting the variable vanes to decrease a cross sectional opening of the exhaust turbine, and decreasing the exhaust pressure upstream of the exhaust turbine includes adjusting the variable vanes to increase the cross sectional opening of the exhaust turbine.

As another example, a method comprises: responsive to a load of an engine decreasing below a threshold, closing a variable inlet device of a compressor coupled to an air intake of the engine and closing a recirculation passage of the compressor via a common actuator; and responsive to the load reaching or exceeding the threshold, opening the variable inlet device and opening the recirculation passage via the common actuator. In the preceding example, additionally or optionally, the compressor includes an impeller disposed in an inlet passage, the variable inlet device is positioned in the inlet passage of the compressor upstream of the impeller, the variable inlet device includes a plurality of vanes, and closing the variable inlet device comprises extending the plurality of vanes into the inlet passage to reduce an inlet diameter of the impeller. In any or all of the preceding examples, additionally or optionally, opening the variable inlet device comprises retracting the plurality of vanes into a wall of the inlet passage in order to increase the inlet diameter of the impeller. In any or all of the preceding examples, additionally or optionally, the common actuator adjusts a radial position of the plurality of vanes and an amount of opening of the recirculation passage in a concerted manner. In any or all of the preceding examples, the method additionally or optionally further comprises, while the engine load is less than the threshold, anticipating reaching or exceeding the threshold based on a real-time estimation of a distance from the threshold; and responsive to at least one of the real-time estimation of the distance from the threshold being within a pre-determined amount and the real-time estimation of the distance decreasing at a rate greater than a threshold rate, adjusting an amount of power delivered to a turbine driving the compressor. In any or all of the preceding examples, additionally or optionally, adjusting the amount of power delivered to the turbine driving the compressor includes one or more of adjusting a geometry of the turbine and adjusting a position of an exhaust gas recirculation valve coupled upstream of the turbine to increase a pressure upstream of the turbine.

As another example, a system comprises: an engine including an engine intake; a compressor coupled to the engine intake, the compressor comprising: a casing treatment forming a recirculation passage surrounding an intake passage; an impeller disposed within the intake passage; a variable inlet device positioned in the intake passage upstream of the impeller and configured to selectively restrict gas flow through the impeller; and an actuation system configured to simultaneously adjust a diameter of the variable inlet device and control gas flow through the recirculation passage; and a controller storing executable instructions in non-transitory memory that, when executed, cause the controller to: actuate the actuation system to decrease the diameter of the variable inlet device and block gas flow through the recirculation passage in response to engine load decreasing below a threshold; and actuate the actuation system to increase the diameter of the variable inlet device and enable gas flow through the recirculation passage in response to the engine load reaching or increasing above the threshold. In the preceding example, additionally or optionally, the actuation system comprises a motor and a unison ring rotatable via the motor. In any or all of the preceding examples, additionally or optionally, the unison ring includes a plurality of slots and the variable inlet device includes a plurality of vanes, each of the plurality of vanes coupled to one of the plurality of slots via an arm and a pin, and rotating the unison ring slides each pin along each slot to radially move the plurality of vanes, thereby adjusting the diameter of the variable inlet device. In any or all of the preceding examples, additionally or optionally, the unison ring includes a valve that blocks gas flow through the recirculation passage in a closed position and enables gas flow through the recirculation passage in an open position.

In another representation, a method comprises: responsive to a compressor mass flow rate and pressure ratio operating point decreasing below a threshold, closing a variable inlet device of the compressor and closing a recirculation passage of the compressor by rotating a unison ring in a first direction; and responsive to the compressor mass flow rate and pressure ratio operating point reaching or exceeding the threshold, opening the variable inlet device and opening the recirculation passage by rotating the unison ring in a second direction, opposite the first direction. In the preceding example, additionally or optionally, the unison ring includes a plurality of slots and the variable inlet device includes a plurality of vanes, each of the plurality of vanes coupled to one of the plurality of slots via an arm and a pin. In any or all of the preceding examples, additionally or optionally, rotating the unison ring in the first direction slides each pin along each slot to radially move the plurality of vanes to a smaller diameter position. In any or all of the preceding examples, additionally or optionally, rotating the unison ring in the second direction slides each pin along each slot to radially move the plurality of vanes to a larger diameter position. In any or all of the preceding examples, additionally or optionally, the unison ring includes a valve, rotating the unison ring in the first direction places the valve in a closed position that prevents gas flow through the recirculation passage, and rotating the unison ring in the second direction places the valve in an open position that enables gas flow through the recirculation passage. In any or all of the preceding examples, additionally or optionally, the unison ring is coupled to a motor via a shaft, rotating the unison ring in the first direction includes laterally moving the shaft in a first direction via the motor, and rotating the unison ring in the second direction includes laterally moving the shaft in a second direction, opposite of the first direction, via the motor. In any or all of the preceding examples, additionally or optionally, the compressor is driven by an exhaust turbine, and the method further comprises: in anticipation of the compressor mass flow rate and pressure ratio operating point reaching or exceeding the threshold, increasing an amount of power provided to the exhaust turbine; and, responsive to the compressor mass flow rate and pressure ratio operating point reaching or exceeding the threshold, decreasing the amount of power provided to the exhaust turbine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a compressor configured to supply compressed gas to an engine, comprising:
adjusting an effective flow area of gas flow through an inlet passage to an impeller of the compressor via a plurality of vanes of a variable inlet device positioned in the inlet passage immediately upstream from a leading edge of the impeller while also adjusting gas flow through a casing treatment surrounding the inlet passage, the effective flow area and the gas flow through the casing treatment both adjusted via a controller and a common, single actuator based on sensed and/or inferred operating conditions of the engine as determined via a sensor.

2. The method of claim 1, wherein adjusting the effective flow area of the impeller comprises adjusting an open area of the plurality of vanes of the variable inlet device positioned in the inlet passage immediately upstream from the leading edge of the impeller while simultaneously adjusting a position of a valve within a recirculation passage of the casing treatment to adjust the gas flow through the casing treatment, the recirculation passage fluidically coupled to the inlet passage downstream of the leading edge of the impeller and upstream of the variable inlet device.

3. The method of claim 2, wherein adjusting the effective flow area of the impeller and adjusting gas flow through the casing treatment via the single actuator based on sensed and/or inferred operating conditions comprises:
adjusting, via the controller, the plurality of vanes of the variable inlet device to a smaller, first open area to reduce the effective flow area while adjusting the valve to a closed position to block gas flow through the recirculation passage in response to sensed or inferred engine load of the engine decreasing below a threshold engine load; and
adjusting, via the controller, the plurality of vanes of the variable inlet device to a larger, second open area to increase the effective flow area while adjusting the valve to an open position to enable gas flow through the recirculation passage in response to the sensed or inferred engine load reaching or exceeding the threshold engine load.

4. The method of claim 3, further comprising, responsive to adjusting the plurality of vanes of the variable inlet device from the first open area to the second open area, adjusting, via the controller, a position of a throttle valve positioned downstream of the compressor and upstream of the engine.

5. The method of claim 3, further comprising, responsive to adjusting the plurality of vanes of the variable inlet device from the first open area to the second open area, adjusting, via the controller, ignition timing of the engine.

6. The method of claim 3, wherein adjusting the effective flow area of the impeller while also adjusting the gas flow through the casing treatment via the single actuator comprises activating a motor to rotate a unison ring coupled to the valve and to the plurality of vanes of the variable inlet device.

7. The method of claim 6, wherein:
adjusting the plurality of vanes of the variable inlet device to the first open area while adjusting the valve to the closed position comprises activating the motor to rotate the unison ring in a first direction, thereby moving the valve into the recirculation passage to block the gas flow through the recirculation passage and moving the plurality of vanes to protrude in the inlet passage and block gas flow at the leading edge of the impeller; and
adjusting the plurality of vanes of the variable inlet device to the second open area while adjusting the valve to the open position comprises activating the motor to rotate the unison ring in a second direction, thereby moving the valve out of the recirculation passage such that airflow through the recirculation passage is enabled and retracting the plurality of vanes from the inlet passage to within walls of the casing treatment to enable gas flow at the leading edge of the impeller.

8. The method of claim 3, wherein the compressor is driven by an exhaust turbine and the method further comprises:
prior to adjusting the plurality of vanes of the variable inlet device to the larger, second open area while adjusting the valve to the open position, increasing an exhaust pressure upstream of the exhaust turbine; and
after adjusting the plurality of vanes of the variable inlet device to the larger, second open area while adjusting the valve to the open position, decreasing the exhaust pressure upstream of the exhaust turbine.

9. The method of claim 8, wherein an exhaust gas recirculation passage is coupled upstream of the exhaust turbine and downstream of the compressor, increasing the exhaust pressure upstream of the exhaust turbine includes decreasing an opening of an exhaust gas recirculation valve disposed in the exhaust gas recirculation passage, and decreasing the exhaust pressure upstream of the exhaust turbine includes increasing an opening of the exhaust gas recirculation valve.

10. The method of claim 8, wherein the exhaust turbine includes variable vanes, increasing the exhaust pressure upstream of the exhaust turbine includes adjusting, via the controller, the variable vanes to decrease a cross sectional opening of the exhaust turbine, and decreasing the exhaust pressure upstream of the exhaust turbine includes adjusting, via the controller, the variable vanes to increase the cross sectional opening of the exhaust turbine.

11. A method for a compressor configured to supply compressed gas to an engine, comprising:
responsive to a sensed or inferred load of the engine decreasing below a threshold, closing, via a controller, a variable inlet device of a compressor by extending a plurality of vanes of the variable inlet device into an inlet passage, the compressor including an impeller disposed in the inlet passage downstream of the variable inlet device and coupled to an aft intake of the engine, and closing a recirculation passage of the compressor via a common actuator, and where extending the plurality of vanes into the inlet passage reduces an inlet diameter of the impeller; and
responsive to the sensed or inferred load reaching or exceeding the threshold, opening, via the controller, the variable inlet device and opening the recirculation passage via the common actuator.

12. The method of claim 11, wherein opening the variable inlet device comprises retracting the plurality of vanes into a wall of the inlet passage in order to increase the inlet diameter of the impeller.

13. The method of claim 12, wherein the common actuator adjusts a radial position of the plurality of vanes and an amount of opening of the recirculation passage in a concerted manner.

14. The method of claim 11, further comprising:
while the sensed or inferred load is less than the threshold, anticipating reaching or exceeding the threshold based on a real-time estimation of a distance from the threshold; and
responsive to at least one of the real-time estimation of the distance from the threshold being within a pre-determined amount and the real-time estimation of the distance decreasing at a rate greater than a threshold rate, adjusting, via the controller, an amount of power delivered to a turbine driving the compressor.

15. The method of claim 14, wherein adjusting the amount of power delivered to the turbine driving the compressor includes one or more of adjusting, via the controller, a geometry of the turbine and adjusting, via the controller, a position of an exhaust gas recirculation valve coupled upstream of the turbine to increase a pressure upstream of the turbine.

16. A system, comprising:
an engine including an engine intake;
a compressor coupled to the engine intake, the compressor comprising:
a casing treatment forming a recirculation passage surrounding an intake passage;
an impeller disposed within the intake passage;
a variable inlet device positioned in the intake passage upstream of the impeller and configured to selectively restrict gas flow through the impeller; and
an actuation system configured to simultaneously adjust a diameter of the variable inlet device and control gas flow through the recirculation passage; and
a controller storing executable instructions in non-transitory memory that, when executed, cause the controller to:
actuate the actuation system to decrease the diameter of the variable inlet device and block gas flow through the recirculation passage in response to sensed or inferred engine load decreasing below a threshold; and
actuate the actuation system to increase the diameter of the variable inlet device and enable gas flow through the recirculation passage in response to the sensed or inferred engine load reaching or increasing above the threshold.

17. The system of claim 16, wherein the actuation system comprises a motor and a unison ring rotatable via the motor.

18. The system of claim 17, wherein the unison ring includes a plurality of slots and the variable inlet device includes a plurality of vanes, each of the plurality of vanes coupled to one of the plurality of slots via an arm and a pin, and rotating the unison ring slides each pin along each slot to radially move the plurality of vanes, thereby adjusting the diameter of the variable inlet device.

19. The system of claim 17, wherein the unison ring includes a valve that blocks gas flow through the recirculation passage in a closed position and enables gas flow through the recirculation passage in an open position.

* * * * *